(12) United States Patent
Kuhn

(10) Patent No.: US 11,130,643 B2
(45) Date of Patent: Sep. 28, 2021

(54) MODULAR SORTATION UNITS, SYSTEMS, AND METHODS

(71) Applicant: Regal Beloit America, Inc., Beloit, WI (US)

(72) Inventor: John William Kuhn, Cold Spring, KY (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 16/863,190

(22) Filed: Apr. 30, 2020

(65) Prior Publication Data

US 2021/0078808 A1 Mar. 18, 2021

Related U.S. Application Data

(63) Continuation of application No. 16/197,202, filed on Nov. 20, 2018, now Pat. No. 10,640,303.

(Continued)

(51) Int. Cl.
*B65G 47/84* (2006.01)
*B65G 47/46* (2006.01)
(Continued)

(52) U.S. Cl.
CPC ........... *B65G 47/841* (2013.01); *B65G 15/42* (2013.01); *B65G 17/24* (2013.01); *B65G 47/46* (2013.01);
(Continued)

(58) Field of Classification Search
CPC ...... B65G 47/841; B65G 15/42; B65G 17/24; B65G 47/46; B65G 47/96; B65G 47/54;
(Continued)

(56) References Cited

U.S. PATENT DOCUMENTS 1,353,874 A 9/1920 Wego
2,983,352 A 5/1961 Flora et al.
(Continued)

FOREIGN PATENT DOCUMENTS

CN 101171189 A 4/2008
CN 202245193 U 5/2012
(Continued)

OTHER PUBLICATIONS

Invitation to Pay Additional Fees from corresponding International Patent Application No. PCT/US2018/62129, dated Jan. 15, 2019, in 2 pages.

(Continued)

*Primary Examiner* — James R Bidwell
(74) *Attorney, Agent, or Firm* — Knobbe, Martens, Olson & Bear, LLP

(57) ABSTRACT

A modular transfer system with a primary flow system and a diverter system that is repositionable along a track system. The primary flow system includes a primary flow belt for conveying an article along a primary flow path from an infeed side of the modular transfer system to a pass-through side of the modular transfer system. The diverter system that is repositionable along the track system between the infeed side and the pass-through side by attachment within one or more channels.

20 Claims, 11 Drawing Sheets

Related U.S. Application Data

(60) Provisional application No. 62/590,233, filed on Nov. 22, 2017.

(51) Int. Cl.
*B65G 15/42* (2006.01)
*B65G 17/24* (2006.01)
*B65G 47/96* (2006.01)

(52) U.S. Cl.
CPC ...... *B65G 47/96* (2013.01); *B65G 2203/0208* (2013.01); *B65G 2203/042* (2013.01); *B65G 2207/30* (2013.01)

(58) Field of Classification Search
CPC ...... B65G 13/07; B65G 13/071; B65G 13/10; B65G 47/22; B65G 47/24; B65G 2203/0208; B65G 2207/30; B65G 2203/042
USPC .......................................... 198/370.09, 371.3
See application file for complete search history.

(56) References Cited

U.S. PATENT DOCUMENTS

| | | |
|---|---|---|
| 3,204,680 A | 7/1965 | Barry |
| 3,252,556 A | 5/1966 | Sven-eric |
| 3,593,591 A | 7/1971 | Chantland |
| 3,768,614 A | 10/1973 | Tabler |
| 3,934,953 A | 1/1976 | Tooley |
| 4,008,800 A | 2/1977 | Forsyth |
| 4,059,180 A | 11/1977 | Krivec et al. |
| 4,100,368 A | 7/1978 | Thomsen |
| 4,101,180 A | 7/1978 | Anderson et al. |
| 4,148,386 A | 4/1979 | Bradbury |
| 4,168,771 A | 9/1979 | Krivec |
| 4,221,288 A | 9/1980 | Rae |
| 4,301,915 A | 11/1981 | Michalik et al. |
| 4,372,441 A | 2/1983 | Hans et al. |
| 4,383,605 A | 5/1983 | Harwick |
| 4,418,817 A | 12/1983 | Martin et al. |
| 4,448,302 A | 5/1984 | Weaver et al. |
| 4,476,974 A | 10/1984 | Bradbury |
| 4,508,212 A | 4/1985 | Bolle et al. |
| 4,577,747 A | 3/1986 | Martin |
| 4,664,243 A | 5/1987 | Martin |
| 4,681,203 A | 7/1987 | Kornylak |
| 4,681,215 A | 7/1987 | Martin |
| 4,815,588 A | 3/1989 | Katsuragi et al. |
| 4,925,009 A | 5/1990 | Hill et al. |
| 5,080,219 A | 1/1992 | Imai et al. |
| 5,096,045 A | 3/1992 | Feldl |
| 5,129,507 A | 7/1992 | Maeda et al. |
| 5,163,210 A | 11/1992 | Lostra |
| 5,188,210 A | 2/1993 | Malow |
| 5,222,920 A | 6/1993 | Cheesman et al. |
| 5,228,820 A | 7/1993 | Stansfield et al. |
| 5,238,099 A | 8/1993 | Schroeder et al. |
| 5,240,102 A | 8/1993 | Lucas |
| 5,261,525 A | 11/1993 | Gabagnati |
| 5,289,913 A | 3/1994 | Fujio et al. |
| 5,361,884 A | 11/1994 | Yonezawa |
| 5,427,218 A | 6/1995 | Yonezawa |
| 5,597,156 A | 1/1997 | Classen |
| 5,609,238 A | 3/1997 | Christensen |
| 5,634,550 A | 6/1997 | Ensch et al. |
| 5,645,155 A | 7/1997 | Houghton |
| 5,653,325 A | 8/1997 | Enomoto |
| 5,701,992 A | 12/1997 | Enomoto |
| 5,735,388 A | 4/1998 | Brouwer |
| 5,810,158 A | 9/1998 | Schiesser et al. |
| 5,850,902 A | 12/1998 | Hicks et al. |
| 5,860,784 A | 1/1999 | Schuitema et al. |
| 5,862,907 A | 1/1999 | Taylor |
| 5,868,238 A | 2/1999 | Bonnet |
| 5,911,306 A | 6/1999 | Ferrari |
| 5,918,723 A | 7/1999 | Schuitema et al. |
| 5,927,465 A | 7/1999 | Shearer, Jr. |
| 5,971,618 A | 10/1999 | Ledingham |
| 6,008,556 A | 12/1999 | Ramthun |
| 6,041,909 A | 3/2000 | Shearer, Jr. |
| 6,056,107 A | 5/2000 | Schuitema et al. |
| 6,065,588 A | 5/2000 | Cotter et al. |
| 6,068,105 A | 5/2000 | Darwish et al. |
| 6,112,875 A | 9/2000 | Gibson |
| 6,126,017 A | 10/2000 | Hours |
| 6,138,819 A | 10/2000 | Bogle et al. |
| 6,139,240 A | 10/2000 | Ando |
| 6,148,990 A | 11/2000 | Lapeyre et al. |
| 6,168,544 B1 | 1/2001 | Barnes et al. |
| 6,196,375 B1 | 3/2001 | Cozza |
| 6,209,714 B1 | 4/2001 | Lapeyre et al. |
| 6,269,939 B1 | 8/2001 | Lapeyre et al. |
| 6,318,544 B1 | 11/2001 | O'Connor et al. |
| 6,343,685 B1 * | 2/2002 | Hofer ................... B65G 47/53 198/370.09 |
| 6,359,247 B1 * | 3/2002 | Lem ....................... B07C 3/065 198/349 |
| 6,367,616 B1 | 4/2002 | Lapeyre et al. |
| 6,370,447 B1 | 4/2002 | Miyazaki |
| 6,390,756 B1 | 5/2002 | Isaacs et al. |
| 6,398,015 B1 | 6/2002 | Sedlacek et al. |
| 6,454,082 B1 | 9/2002 | McTaggart et al. |
| 6,471,043 B2 | 10/2002 | Schwingshandl et al. |
| 6,493,939 B2 | 12/2002 | Ledingham |
| 6,494,312 B2 | 12/2002 | Costanzo |
| 6,533,099 B2 | 3/2003 | Bonham et al. |
| 6,550,609 B2 | 4/2003 | Coen et al. |
| 6,568,522 B1 | 5/2003 | Boelaars |
| 6,571,937 B1 | 6/2003 | Costanzo et al. |
| 6,578,697 B2 | 6/2003 | Bonham et al. |
| 6,688,459 B1 | 2/2004 | Bonham et al. |
| 6,705,452 B2 | 3/2004 | Greve et al. |
| 6,732,849 B2 | 5/2004 | Yamamoto |
| 6,752,534 B2 | 6/2004 | Ledingham |
| 6,758,323 B2 | 7/2004 | Costanzo |
| 6,860,376 B1 | 3/2005 | Heit et al. |
| 6,889,822 B1 | 5/2005 | Wagner et al. |
| 6,923,309 B2 | 8/2005 | Costanzo |
| 6,932,211 B2 | 8/2005 | Wieting et al. |
| 6,997,306 B2 | 2/2006 | Sofranec et al. |
| 6,997,309 B2 | 2/2006 | Stebnicki et al. |
| 7,007,792 B1 | 3/2006 | Burch |
| 7,011,208 B2 | 3/2006 | Nakashima |
| 7,040,480 B2 | 5/2006 | Sedlacek |
| 7,055,669 B2 | 6/2006 | Veit |
| 7,111,722 B2 | 9/2006 | Burch |
| 7,117,988 B2 | 10/2006 | Veit et al. |
| 7,124,876 B2 | 10/2006 | Wolf |
| 7,128,197 B2 | 10/2006 | Haan |
| 7,131,531 B1 | 11/2006 | Ryan |
| 7,137,505 B2 | 11/2006 | Stebnicki et al. |
| 7,145,095 B2 | 12/2006 | Cerutti et al. |
| 7,147,097 B2 | 12/2006 | Lemm |
| 7,191,894 B2 | 3/2007 | Costanzo et al. |
| 7,198,145 B1 | 4/2007 | Brown et al. |
| 7,213,701 B2 | 5/2007 | Deur |
| 7,216,759 B2 | 5/2007 | Rau et al. |
| 7,237,670 B1 | 7/2007 | Ryan |
| 7,240,781 B2 | 7/2007 | Ramaker et al. |
| 7,246,700 B2 | 7/2007 | Stebnicki et al. |
| 7,249,669 B2 | 7/2007 | Fourney |
| 7,249,671 B2 | 7/2007 | Riddick et al. |
| 7,252,192 B2 | 8/2007 | Stebnicki et al. |
| 7,284,653 B2 | 10/2007 | Fourney et al. |
| 7,284,654 B2 | 10/2007 | Affaticati et al. |
| 7,290,649 B2 | 11/2007 | Wolkerstorfer |
| 7,306,086 B2 | 12/2007 | Boelaars |
| 7,331,448 B2 | 2/2008 | Stebnicki et al. |
| 7,334,676 B1 | 2/2008 | McGourin et al. |
| 7,344,018 B2 | 3/2008 | Costanzo et al. |
| 7,360,641 B1 | 4/2008 | Fourney |
| 7,364,038 B2 | 4/2008 | Damkjaer |
| 7,383,935 B2 | 6/2008 | Tasma et al. |

(56) References Cited

U.S. PATENT DOCUMENTS

| | | |
|---|---|---|
| 7,398,874 B2 | 7/2008 | Deur |
| 7,419,043 B2 | 9/2008 | Veit |
| 7,422,098 B2 | 9/2008 | Bonham et al. |
| 7,426,992 B2 | 9/2008 | Fourney |
| 7,441,646 B2 | 10/2008 | Heit et al. |
| 7,461,739 B2 | 12/2008 | Fourney |
| 7,467,708 B2 | 12/2008 | McGettigan et al. |
| 7,497,316 B2 | 3/2009 | Hysell et al. |
| 7,506,750 B2 | 3/2009 | Costanzo et al. |
| 7,506,751 B2 | 3/2009 | Fourney |
| 7,513,356 B2 | 4/2009 | Veit et al. |
| 7,516,835 B2 | 4/2009 | Neiser et al. |
| 7,527,146 B2 | 5/2009 | Stebnicki et al. |
| 7,530,441 B2 | 5/2009 | Zimmer |
| 7,533,766 B1 | 5/2009 | Fourney |
| 7,537,104 B2 | 5/2009 | Riddick et al. |
| 7,537,105 B2 | 5/2009 | Fourney |
| 7,537,106 B2 | 5/2009 | Fourney |
| 7,540,368 B2 | 6/2009 | Weiser |
| 7,549,527 B2 | 6/2009 | Neiser et al. |
| 7,556,136 B2 | 7/2009 | Marshall et al. |
| 7,556,142 B2 | 7/2009 | Stebnicki et al. |
| 7,562,761 B2 | 7/2009 | Tasma et al. |
| 7,563,188 B2 | 7/2009 | Ozaki et al. |
| 7,581,632 B2 | 9/2009 | Wallace et al. |
| 7,588,137 B2 | 9/2009 | Fourney |
| 7,591,366 B2 | 9/2009 | Taylor |
| 7,604,110 B2 | 10/2009 | Deur |
| 7,607,533 B2 | 10/2009 | Pressler et al. |
| 7,617,923 B2 | 11/2009 | Riddick et al. |
| 7,681,710 B2 | 3/2010 | Kuhn et al. |
| 7,690,497 B2 | 4/2010 | Radwallner et al. |
| 7,725,213 B2 | 5/2010 | Hysell et al. |
| 7,726,461 B2 | 6/2010 | Risley |
| 7,731,010 B2 | 6/2010 | Kissee et al. |
| 7,743,905 B2 | 6/2010 | Fourney |
| 7,748,514 B2 | 7/2010 | Shimizu |
| 7,779,986 B2 | 8/2010 | Enomoto |
| 7,784,601 B2 | 8/2010 | Riddick et al. |
| 7,841,461 B2 | 11/2010 | Nguyen et al. |
| 7,854,314 B2 | 12/2010 | Pelak et al. |
| 7,857,116 B2 | 12/2010 | Heit et al. |
| 7,861,847 B2 | 1/2011 | Fourney et al. |
| 7,861,849 B2 | 1/2011 | Fourney |
| 7,863,536 B2 | 1/2011 | Cerutti et al. |
| 7,874,418 B2 | 1/2011 | Steinsträter et al. |
| 7,878,319 B2 | 2/2011 | Costanzo et al. |
| 7,886,892 B2 | 2/2011 | Fourney |
| 7,891,481 B2 | 2/2011 | Pressler et al. |
| 7,905,345 B2 | 3/2011 | Taylor |
| 7,942,257 B2 | 5/2011 | DePaso et al. |
| 7,971,701 B2 | 7/2011 | Fourney |
| 7,992,701 B2 | 8/2011 | Wolf |
| 8,060,245 B2 | 11/2011 | Lupton et al. |
| 8,079,462 B2 | 12/2011 | Pelak et al. |
| 8,100,252 B2 | 1/2012 | Fourney |
| 8,104,606 B2 | 1/2012 | Rogers et al. |
| 8,109,384 B2 | 2/2012 | Pressler et al. |
| 8,123,021 B2 | 2/2012 | DePaso et al. |
| D657,807 S | 4/2012 | Frazier |
| 8,167,111 B2 | 5/2012 | Asman |
| 8,167,118 B2 | 5/2012 | Fourney |
| 8,172,069 B2 | 5/2012 | Prakasam |
| 8,186,031 B2 | 5/2012 | Whitney et al. |
| 8,186,499 B2 | 5/2012 | Brandt et al. |
| 8,196,736 B2 | 6/2012 | Wagner |
| 8,205,738 B1 | 6/2012 | Fourney |
| 8,308,368 B2 | 11/2012 | Blair et al. |
| D672,794 S | 12/2012 | Frazier |
| 8,342,313 B2 | 1/2013 | Wargo et al. |
| 8,364,307 B2 | 1/2013 | Carlson et al. |
| 8,371,431 B2 | 2/2013 | Neiser et al. |
| 8,424,675 B2 | 4/2013 | Rau |
| 8,459,440 B2 | 6/2013 | Onayama |
| 8,469,177 B2 | 6/2013 | Steenwyk |
| 8,469,178 B2 | 6/2013 | Butler |
| 8,474,596 B2 | 7/2013 | Wolkerstorfer et al. |
| 8,474,602 B2 | 7/2013 | Miller |
| 8,496,105 B2 | 7/2013 | MacLachlan et al. |
| 8,499,926 B2 | 8/2013 | Steinsträter et al. |
| 8,511,460 B2 | 8/2013 | Ragan et al. |
| 8,528,742 B2 | 9/2013 | Wargo et al. |
| 8,534,172 B2 | 9/2013 | Fourney |
| 8,573,389 B2 | 11/2013 | Stebnicki et al. |
| 8,579,105 B2 | 11/2013 | Butler et al. |
| 8,622,202 B2 | 1/2014 | Rau et al. |
| 8,646,595 B2 | 2/2014 | Miller et al. |
| 8,720,668 B2 | 5/2014 | Ragan et al. |
| 8,746,442 B2 | 6/2014 | Schwai |
| 8,753,060 B2 | 6/2014 | Ueda et al. |
| 8,757,353 B2 | 6/2014 | Nieser et al. |
| 8,763,788 B2 | 7/2014 | Neiser |
| 8,763,789 B2 | 7/2014 | Wallace |
| 8,776,982 B2 | 7/2014 | Onayama |
| 8,790,061 B2 | 7/2014 | Yamashita |
| 8,813,943 B2 | 8/2014 | Ramankutty et al. |
| 8,820,520 B2 | 9/2014 | Triesenberg et al. |
| 8,825,205 B2 | 9/2014 | Yokota et al. |
| 8,862,306 B2 | 10/2014 | Yokota et al. |
| 8,899,407 B2 | 12/2014 | Harrington |
| 8,915,353 B2 | 12/2014 | Fourney |
| 8,919,542 B2 | 12/2014 | Triesenberg et al. |
| 8,973,506 B2 | 3/2015 | Yamashita |
| 8,978,879 B2 | 3/2015 | Fourney |
| 8,983,651 B2 | 3/2015 | Combs et al. |
| 8,985,304 B2 | 3/2015 | Guernsey et al. |
| 9,004,264 B2 | 4/2015 | Baek, IV et al. |
| 9,016,456 B1 | 4/2015 | Neiser et al. |
| 9,020,632 B2 | 4/2015 | Naylor |
| 9,037,290 B2 | 5/2015 | Neiser et al. |
| 9,038,809 B2 | 5/2015 | Wilkins et al. |
| 9,073,703 B2 | 7/2015 | Fourney |
| 9,079,717 B1 | 7/2015 | Costanzo et al. |
| 9,096,379 B2 | 8/2015 | Gilley et al. |
| 9,108,807 B1 | 8/2015 | Ogle, II |
| 9,150,362 B2 | 10/2015 | Vegh et al. |
| 9,156,629 B2 | 10/2015 | Costanzo et al. |
| 9,193,533 B2 | 11/2015 | Fourney |
| 9,199,802 B2 | 12/2015 | Neiser et al. |
| 9,216,862 B2 | 12/2015 | Wallace et al. |
| 9,227,785 B2 | 1/2016 | Chinnock et al. |
| 9,233,803 B2 | 1/2016 | Pilarz et al. |
| 9,254,930 B2 | 2/2016 | Cremer |
| 9,290,333 B2 | 3/2016 | Skanse et al. |
| 9,302,855 B2 | 4/2016 | Guernsey et al. |
| 9,309,054 B2 | 4/2016 | Scates |
| 9,309,058 B2 | 4/2016 | Maglaty |
| 9,315,341 B2 | 4/2016 | Ieist |
| 9,327,916 B2 | 5/2016 | DeRoche |
| 9,334,113 B2 | 5/2016 | Naylor |
| 9,340,357 B2 | 5/2016 | Wilkins et al. |
| 9,371,194 B2 | 6/2016 | Ragan |
| 9,399,558 B2 | 7/2016 | Guernsey et al. |
| 9,409,727 B2 | 8/2016 | German |
| 9,428,338 B2 | 8/2016 | Ragan |
| 9,434,547 B2 | 9/2016 | Marshall et al. |
| 9,452,896 B2 | 9/2016 | Lee |
| 9,457,961 B2 | 10/2016 | Green, III |
| 9,463,931 B2 | 10/2016 | Nagel et al. |
| 9,469,486 B2 | 10/2016 | German |
| 9,471,009 B2 | 10/2016 | Kikuchi et al. |
| 9,481,516 B1 | 11/2016 | Kraus et al. |
| 9,493,308 B2 | 11/2016 | Hoynash et al. |
| 9,493,313 B2 | 11/2016 | Vegh |
| 9,499,346 B2 | 11/2016 | Triensenberg et al. |
| 9,555,972 B2 | 1/2017 | Ishikawa et al. |
| 9,555,976 B2 | 1/2017 | Eure et al. |
| 9,567,164 B2 | 2/2017 | Kirkpatrick et al. |
| 9,573,772 B2 | 2/2017 | Fourney |
| 9,586,763 B2 | 3/2017 | Reischl |
| 9,592,983 B2 | 3/2017 | Costanzo et al. |
| 9,624,043 B2 | 4/2017 | Koetje et al. |
| 9,630,784 B2 | 4/2017 | Ragan |
| 9,741,009 B2 | 8/2017 | Berghorn et al. |

(56) References Cited

U.S. PATENT DOCUMENTS

| | | |
|---|---|---|
| 9,745,143 B2 | 8/2017 | Wilkins |
| 9,751,695 B2 | 9/2017 | DeGroot et al. |
| 9,776,800 B2 | 10/2017 | Westergaard Andersen |
| 9,776,806 B2 | 10/2017 | Reischl |
| 9,815,632 B2 | 11/2017 | DePaso et al. |
| 9,828,187 B2 | 11/2017 | Chierego et al. |
| 9,878,856 B2 | 1/2018 | Specht |
| 9,988,218 B2 | 6/2018 | Dugat et al. |
| 10,221,020 B2 | 3/2019 | Menke et al. |
| 10,239,704 B2 | 3/2019 | Messner |
| 10,532,894 B2 * | 1/2020 | Kuhn .................. B65G 13/071 |
| 10,640,303 B2 * | 5/2020 | Kuhn .................. B65G 47/96 |
| 2001/0014190 A1 | 8/2001 | Ledingham |
| 2004/0007439 A1 | 1/2004 | Wolkerstorfer |
| 2004/0201160 A1 | 10/2004 | Nakashima |
| 2005/0155846 A1 | 7/2005 | Sofranec et al. |
| 2006/0038452 A1 | 2/2006 | Lesak |
| 2006/0076216 A1 | 4/2006 | Wagner et al. |
| 2006/0219526 A1 | 10/2006 | Costanzo et al. |
| 2006/0225284 A1 | 10/2006 | Byerly et al. |
| 2006/0260917 A1 | 11/2006 | Ozaki et al. |
| 2007/0007108 A1 | 1/2007 | Veit |
| 2007/0119690 A1 | 5/2007 | Lupton |
| 2008/0121498 A1 | 5/2008 | Costanzo |
| 2008/0302634 A1 | 12/2008 | Costanzo et al. |
| 2009/0008218 A1 | 1/2009 | Fourney |
| 2009/0039592 A1 | 2/2009 | Jans et al. |
| 2009/0152074 A1 | 6/2009 | Wolf |
| 2009/0314608 A1 | 12/2009 | Rogers et al. |
| 2010/0193329 A1 | 8/2010 | Wargo |
| 2011/0022221 A1 | 1/2011 | Fourney |
| 2011/0297509 A1 | 12/2011 | Taylor |
| 2012/0080290 A1 | 4/2012 | Fourney |
| 2012/0125735 A1 | 5/2012 | Schuitema et al. |
| 2012/0298481 A1 | 11/2012 | Fourney |
| 2012/0318644 A1 | 12/2012 | MacLachlan et al. |
| 2015/0026983 A1 | 1/2015 | Eure et al. |
| 2015/0144536 A1 | 5/2015 | Dugat |
| 2016/0039611 A1 | 2/2016 | Hoynash et al. |
| 2016/0114980 A1 | 4/2016 | Ishikawa et al. |
| 2016/0159581 A1 | 6/2016 | Fourney |
| 2016/0167885 A1 | 6/2016 | Westergaard Andersen |
| 2016/0200525 A1 | 7/2016 | Coullery |
| 2016/0257499 A1 | 9/2016 | Cribiu |
| 2016/0270562 A1 | 9/2016 | McPherson et al. |
| 2016/0288172 A1 | 10/2016 | Wargo |
| 2016/0325315 A1 | 11/2016 | Zimmer et al. |
| 2017/0034653 A1 | 2/2017 | Ambrefe |
| 2017/0066595 A1 | 3/2017 | Fourney |
| 2017/0144843 A1 | 5/2017 | Pedersen et al. |
| 2017/0330135 A1 | 11/2017 | Taylor et al. |
| 2017/0334661 A1 | 11/2017 | Stefanko et al. |
| 2017/0349383 A1 | 12/2017 | Myers et al. |
| 2018/0257110 A1 | 9/2018 | Lundahl et al. |
| 2019/0152720 A1 | 5/2019 | Kuhn |
| 2019/0185272 A1 * | 6/2019 | Fumagalli ............ B65G 17/345 |
| 2020/0307921 A1 | 10/2020 | Kuhn |

FOREIGN PATENT DOCUMENTS

| | | |
|---|---|---|
| CN | 102849449 A | 1/2013 |
| CN | 205739576 U | 11/2016 |
| CN | 110636981 A | 12/2019 |
| EP | 0068475 A2 | 1/1983 |
| EP | 0438667 A2 | 7/1991 |
| EP | 0560480 A2 | 9/1993 |
| GB | 1554539 A | 10/1979 |
| JP | 2005-138918 A | 6/2005 |
| JP | 2009-292601 A | 12/2009 |
| JP | 2012/121693 A | 6/2012 |
| WO | WO 2006/121749 A1 | 11/2006 |
| WO | WO 2018/165489 A1 | 9/2018 |
| WO | WO 2018/165609 A1 | 9/2018 |
| WO | WO 2019/104095 A2 | 5/2019 |

OTHER PUBLICATIONS

International Search Report and Written Opinion from corresponding International Patent Application No. PCT/US2018/62129, dated Apr. 1, 2019, in 12 pages.

Hairise, Wholesale Har2253 0 USD sample replacement parts transportation belt conveyor belt conveyor system belt, Alibaba.com, accessed in Nov. 2016, in 2 pages.

Hairise, Wholesale Side transfer universal ball modular plastic conveyor belt, Alibaba.com, accessed in Nov. 2016, in 6 pages.

Hairise, Wholesale 2253 flexible universal ball belt, Alibaba.com, accessed in Nov. 2016, in 4 pages.

Hairise, Wholesale Buy Best from Wholesaler Alibaba.com, accessed in Nov. 2016, in 2 pages.

Power Transmission Solutions, "ModSort™ Station Solves Transfer and Division," YouTube video, Oct. 2016, title page in 2 pages and screenshots in 41 pages.

Power Transmission Solutions, "System Plast 2253 Roller Top Belt for Unit Handling," YouTube video, Mar. 2015, title page in 2 pages and screenshots in 46 pages.

System Plast ModSort Right Angle Transfer Module Brochure, 2016.

Regal to Launch MODSORT at Pack Expo., Sep. 2016.

International Preliminary Report on Patentability from corresponding International Patent Application No. PCT/US2018/62129, dated Jun. 4, 2020, in 9 pages.

* cited by examiner

MODULAR SORTATION UNITS, SYSTEMS, AND METHODS

CROSS REFERENCE

This application is a continuation of U.S. patent application Ser. No. 16/197,202, filed Nov. 20, 2018, which claims the priority benefit under at least 35 U.S.C. § 119 of U.S. Patent Application No. 62/590,233 filed Nov. 22, 2017, the entirety of which is hereby incorporated by reference.

BACKGROUND

Field

The present disclosure relates to systems and methods for conveying goods from a first location to a second location. More specifically, some aspects of the present disclosure relate to modular conveyor components that can transfer goods to other components of a conveyor system.

Description of Certain Related Art

Conveyors can be used in various commercial and manufacturing applications to transport articles between different processing stations and locations. A conveyor typically includes a conveyor belt or chain that is arranged in an endless loop and driven to transport the articles on the belt or chain surface along a generally horizontal path.

SUMMARY OF CERTAIN FEATURES

This disclosure encompasses various embodiments of a modular transfer unit and related methods. In some embodiments, the modular transfer unit can include a main belt and a diverter system that can be repositioned relative to the main belt. In certain embodiments, the diverter system can be mounted on and slidable relative to a track system. In certain embodiments, the diverter system can be repositioned along the track system without removing the diverter system therefrom. These embodiments can provide the advantages of making the modular transfer unit easily customizable and reconfigurable.

In another aspect of certain embodiments, the modular transfer unit can include one or more filler sheets. The filler sheets can fill or span gaps between diverter systems or ends of the modular transfer unit. In certain embodiments, the filler sheets engage lower portions of movable members on the main belt. The filler sheets can provide an increased speed for articles travelling on the main belt and engaged with upper portions of the movable members. In certain implementations, the filler sheets can be coated in a sound absorbing material. The sound absorbing filler can reduce noise created by operation of the modular sorting system.

In another aspect of certain embodiments, the modular transfer unit can include a control system. The control system can automatically operate the modular transfer unit in response to reconfiguration of the diverter system on the track system. In one embodiment, the control system can automatically detect the reconfiguration of the diverter system. In another embodiment, the control system can prompt a user to input updated parameters that reflect the reconfiguration of the diverter system. The control system can provide the advantages of being easily reconfigurable in the field and with minimal user training and minimal or no programming support.

BRIEF DESCRIPTION OF THE DRAWINGS

These and other features, aspects and advantages are described below with reference to the drawings, which are intended to illustrate non-limiting example embodiments of modular transfer units.

DETAILED DESCRIPTION OF CERTAIN EMBODIMENTS

Figure 1:
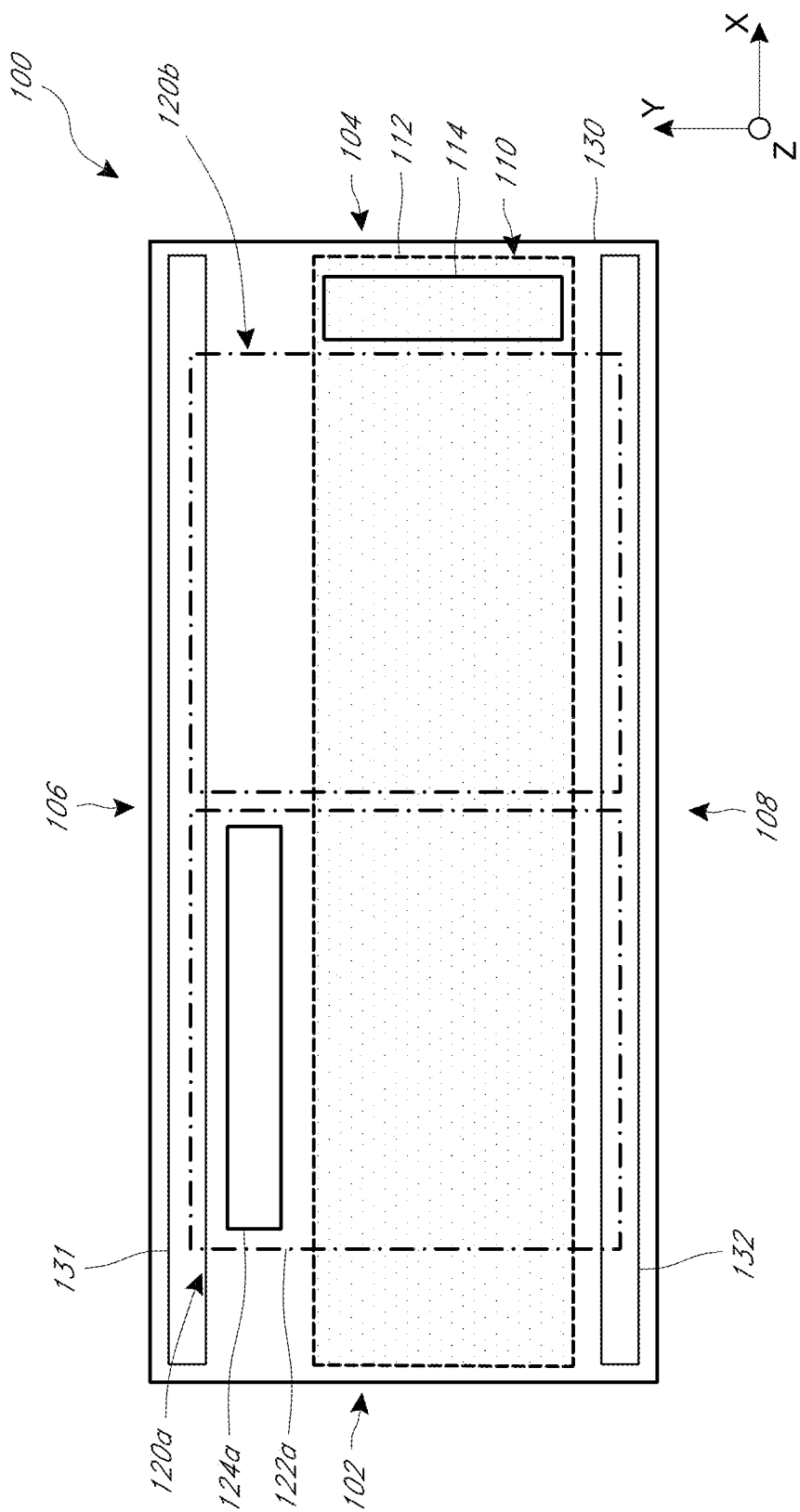
FIG. 1 is a top down schematic of an embodiment of a modular transfer unit.

Various modular transfer units are disclosed. The modular transfer units can be utilized in a conveyor system which can have other conveying devices, such as belted conveyors and/or roller conveyors, which can convey articles as well as receptacles which can receive the conveyed articles at desired locations. The modular transfer units may be self-contained devices which beneficially allow the modular transfer unit to be selectively used in or removed from a conveyor system, or moved around a conveyor system on an as-needed basis. The modular transfer units may be stand-alone devices (e.g., self-supporting and/or not physically secured to other components of the conveyor system). The modular transfer units described herein can have a rectangular shape with four sides. This geometry may allow the modular transfer unit to be more widely implemented in current commercial conveyor systems. However, it is to be understood that the modular transfer unit can have different shapes with a different number of sides (e.g., pentagon with five sides, hexagon with six sides, circular, etc.).

The modular transfer units described herein can receive articles from other components of a conveyor system. In some embodiments, the modular transfer unit can allow the article to "pass through" the modular transfer unit such that the article is allowed to continue along its "primary flow path". That is, the modular transfer unit conveys the article to a component of the conveyor system which is positioned opposite of the component from which the modular transfer unit received the article. This may occur with little to no change in direction for the article.

In some embodiments, the modular transfer unit can divert the article from this "primary flow path". That is, the modular transfer unit redirects the article to a component of the conveyor system which is not positioned opposite of the component from which the modular transfer unit received the article. This may occur with a significant change in direction for the article. For example, as will be shown in the embodiments below, this may cause a generally perpendicular (e.g., about 90 degree) shift in direction for the article; however, it is to be understood that lower degrees of shift (e.g., less than or equal to about: 30 degrees, 45 degrees, 60 degrees, 75 degrees, 90 degrees, etc.) are contemplated.

For purposes of this disclosure, the modular transfer units will be described as having a single infeed side, a single pass-through side, and one or more divert sides. This would be applicable in circumstances in which the modular transfer unit is utilized in a conveyor system which provides articles to the modular transfer unit at a single location. However, it is to be understood that the modular transfer unit can be utilized in conveyor systems having other configurations and which may provide articles to the modular transfer unit at multiple locations. In such circumstances, the modular transfer unit can have multiple infeed sides. Moreover, the pass-through sides may be a divert side or vice versa (depending on the specific location at which the modular transfer unit receives an article).

While the present description sets forth specific details of various embodiments, it will be appreciated that the description is illustrative only and should not be construed in any way as limiting. Additionally, although particular embodiments may be disclosed or shown in the context of conveyor systems which convey articles, it is to be understood that the systems described herein can be utilized with any other types of items, goods or articles. As such, the terms articles, packages, articles, goods, and items may be used interchangeably. For example, any component, structure, step, method, or material that is illustrated and/or described in one embodiments can be omitted or can be used with or instead of any component, structure, step, method, or material this is illustrated and/or described in another embodiment.

Overview of a Modular Transfer Unit

With reference to FIGS. 1 and 2, a schematic of a modular transfer unit 100 is illustrated. With reference first to FIG. 1, the modular transfer unit 100 can have an infeed side 102 at which the modular transfer unit 100 can receive one or more articles from a conveyor system. In some implementations, the modular transfer unit 100 can be attached to components of a conveyor system which deliver the articles to the infeed side 102 of the modular transfer unit 100. The modular transfer unit 100 can allow articles to pass through the modular transfer unit 100 in a primary flow path (e.g., in a direction along the x-axis). The modular transfer unit 100 can have a pass-through side 104 at which the modular transfer unit 100 can discharge articles which are intended to be passed through the modular transfer unit 100. In some implementations, the modular transfer unit 100 can be attached to components of a conveyor system which receive the articles discharged from the pass-through side 104.

The modular transfer unit 100 can redirect or divert articles from the primary flow path. The modular transfer unit 100 can have a first divert side 106 and/or a second divert side 108 at which the modular transfer unit 100 can discharge articles which are intended to be diverted by the modular transfer unit 100. In some implementations, the first divert side 106 and/or the second divert side 108 of the modular transfer unit 100 can be attached to components of a conveyor system which receive the articles which have been diverted from the primary flow path of the conveyor system.

The modular transfer unit 100 can include a first conveyance system 110. The first conveyance system 110, which can be a primary flow system, can move articles along a direction of the primary flow path (e.g., in a direction along the x-axis). As shown, the primary flow system 110 can include a primary flow belt 112 (also called a main belt). The primary flow belt 112 can extend between the infeed side 102 and the pass-through side 104 of the modular transfer unit 100. The primary flow system 110 can include a driver 114, such as a motor, which can be directly coupled to the primary flow belt 112 or indirectly coupled via one or more intermediate components, such as gears. The driver 114 can move the primary flow belt 112 in a direction from the infeed side 102 to the pass-through side 104 of the modular transfer unit 100. In some embodiments, the driver 114 can move the primary flow belt 112 in a direction from the pass-through side 104 to the infeed side 102 of the modular transfer unit 100. The driver 114 can be reversible or intermediate components between the driver 114 and the primary flow belt 112 can allow the driver 114 to drive the primary flow belt 112 in reverse (e.g., a transmission with one or more gears).

In some embodiments, the primary flow belt 112 can be a roller-top belt, such as the 2253RT belt (available from System Plast S.r.l.). The primary flow belt 112 can include any feature or combination of features that are the same, or similar to, those described in any of U.S. Pat. No. 7,021,454, issued Apr. 4, 2006, U.S. Patent Application Publication No. 2018/0257872, filed Mar. 8, 2018, and U.S. Patent Application Publication No. 2018/0257110, filed Mar. 8, 2018, each of which are incorporated by reference herein in their entirety. In some embodiments, the primary flow belt 112 can have a length, measured from the infeed side 102 to the pass-through side 104 of between about 30" to about 250". The primary flow belt 112 can have a width, measured in the conveying plane and generally orthogonal to the length, of between about 16" to about 34". The driver 114 can be coupled to the primary flow belt 112 via a roller, lagged roller, sprocket or other torque transmission feature. The primary flow belt 112 can comprise a plurality of interconnected modules, such as plastic belt modules comprising a body and one or more movable components. Modules that are adjacent to each other in the conveying direction can be hingedly connected, such as with a hinge pin.

With continued reference to FIG. 1, the modular transfer unit 100 can include one or more additional conveyance systems such as a diverter system 120a. The diverter system 120a can move articles in a direction which is non-parallel to the primary flow path of the conveyor system. For example, the diverter system 120a can move articles in a direction not parallel to the x-axis. As shown in the illustrated embodiment, the diverter system 120a can move articles in a direction which is generally orthogonal to the primary flow path of the conveyor system (e.g., the diverter system 120 can move articles in a direction along the y-axis) or in another direction.

The diverter system 120a can include a diverter belt 122a. The diverter belt 122a can extend from the first divert side 106 and/or the second divert side 108 of the modular transfer unit 100. The diverter belt 122a can overlap at least partially with the primary flow belt 112. The diverter system 120a can include a driver 124a, such as a motor, which can be directly coupled to the diverter belt 122a or indirectly coupled via one or more intermediate components, such as a transmission. The driver 124a can move the diverter belt 122a in a direction between the second divert side 108 and the first divert side 106 of the modular transfer unit 100. The driver 124a can be reversible or intermediate components between the driver 124a and the diverter belt 122a can allow the driver 124a to drive the diverter belt 122a in reverse.

In some embodiments, the diverter belt 122a comprises a non-modular belt, such as a fabric conveyor belt. In certain embodiments, the diverter belt 122a can be a Habasit NSW-5ELAV. In some variants, the diverter belt 122a comprises a plurality of interconnected modules, such as plastic belt modules. Modules that are adjacent each other in the conveying direction can be hingedly connected, such as with a hinge pin. The driver 124a can be coupled to the diverter belt 122a via a roller. In some implementations, the roller can be a 1.9" diameter roller.

The modular transfer unit 100 can include one or more filler sheets 120b. The filler sheets 120b can partially or substantially completely span one or more gaps beneath the primary flow belt 112 in the modular transfer unit 100. A gap can be located anywhere along the primary flow belt 112 where the belt 112 is unsupported by the driver 114 or the diverter system 120. The filler sheet 120b can engage with lower portions of the movable components. The filler sheets 120b can be substantially stationary. For example, in some implementations, the filler sheets 120b are substantially stationary relative to the surrounding environment, the diverter system 120a, and/or a frame that supports the filler sheets and 120b and/or the primary flow belt 112. In various embodiments, the filler sheets 120b are not driven and/or do not contact the conveyed articles. In some implementations, the filler sheet 120b can include a bonded friction coating on a top side.

In certain embodiments, the filler sheet 120b can comprise (e.g., be coated with) a sound absorbing material. Such a filler sheet 120b can reduce noise created by operation of the modular sorting system. In some implementations, the sound absorbing material comprises a fabric, a fiber-reinforced plastic, a rubber, or otherwise. In certain variants, the filler sheets 120b comprise a generally rigid layer (e.g., metal or wood or plastic, such as steel or plywood or acrylic) and a sound absorbing layer that comprises the sound absorbing material. The sound absorbing layer can be on the top and/or bottom of the generally rigid layer. In some embodiments, the sound absorbing layer is sufficiently tough and/or resilient to withstand substantially constant engagement with primary flow belt 112.

With continued reference to FIG. 1, the modular transfer unit 100 can include a frame 130 that can be used to support one or more components of the modular transfer unit 100. The frame 130 can support components of the primary flow system 110 and the diverter system 120a, and the filler sheet 120b. The modular transfer unit 100 can be a standalone, self-contained system capable of operating separately from a conveyor system. The frame 130 can be coupled with a conveyor system. In some implementations, the frame 130 can be sized to fit between components of a conveyor system. This can beneficially allow the modular transfer unit 100 to be implemented on an as-needed basis in a conveyor system. In doing so, the modular transfer unit 100 can be swapped from one position in a conveyor system to another position in the conveyor system depending on the needs of the operator. In some implementations, the frame 130 can be sized to be retrofitted to existing conveyor systems. The frame 130 can be assembled together of shorter frame components or frame modules.

The frame 130 can include a track system. The track system can include first and second tracks, 131, 132. The first and second tracks 131, 132 can be disposed on opposite sides of the frame 130. The first track 131 can be generally aligned on the first divert side 106. The second track 132 can be generally aligned along the second divert side 108. The tracks 131, 132 can extend between the in-feed side 102 and the pass-through side 104 of the modular transfer unit 100. The tracks 131, 132 can each be formed of a unitary structure. In other implementations, the tracks 131, 132 can be modular and assembled together of shorter length track modules.

The tracks 131, 132 can include one or more channels. The channels can extend lengthwise (between the in-feed side 102 and the pass-through side 104) on the frame 130. The tracks 131, 132 can be formed by an extrusion process to form therein the channels. The channels can extend substantially the length of the tracks 131, 132. In one implementation, the first and second tracks 131, 132 can comprise extruded aluminum.

The diverter system 120a and/or the filler sheet 120b can be mounted with the channels in the first and second tracks 131, 132. The diverter system 120a and/or the filler sheet 120b can be slidable along the channels or fixed with the channels to reconfigure the modular transfer unit 100. The diverter system 120a and/or the filler sheet 120b can be attached with the channels by one or more bolts, clamps, couplers, or other mechanical coupler.

The diverter system 120a and/or the filler sheet 120b can be repositionable along the tracks. The channels can enable the diverter system 120a and/or the filler sheet 120b to be mountable at various positions between the in-feed side 102 and the pass-through side 104. This can have the advantage of making the modular transfer unit 100 customizable by a user. An advantage of the modular transfer unit 100 is the ability to easily move the diverter system 120a and/or the filler sheet 120b in the field. When issues occur during the design phase and in the field, the modular construction of the modular transfer unit 100 makes quick work of being able to adapt the system according to usage requirements. In several embodiments, the diverter system 120a and/or the filler sheet 120b can be repositioned while remaining connected to the frame 130. For example, in some embodiments, the diverter system 120a and/or the filler sheet 120b can be repositioned along the tracks while remaining connected to the tracks (e.g., not physically separated from, or not disconnected and then reconnected).

The driver 114 and/or the primary flow belt 112 can be mounted to the tracks 131, 132. The tracks 131, 132 can be mounted or installed on the frame 130. The frame 130 can provide rigidity and support to the tracks 131, 132 and the primary flow belt 112.

Figure 2A:
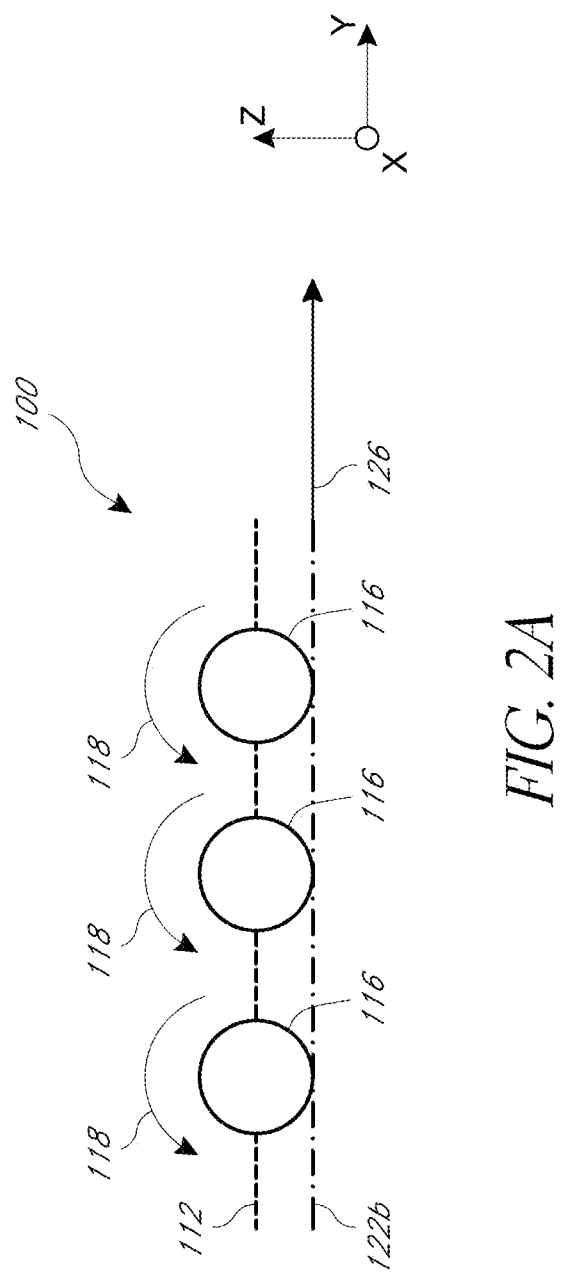
FIG. 2A is a partial cross-sectional schematic of the modular transfer unit of FIG. 1.

With reference next to FIG. 2A, a schematic of the primary flow belt 112 and the diverter belt 122a of the modular transfer unit 100 is illustrated. As shown, the primary flow belt 112 can be positioned above the diverter belt 122a. Movable components 116 of the primary flow belt 112 can contact the diverter belt 122a. The movable components 116 can have one or more translational and/or rotational degrees of freedom. For example, the movable components 116 can be in the form of balls which provide three rotational degrees of freedom. As another example, the movable components 116 can be in the form of rollers which provide one degree of rotational freedom.

The movable components 116 can move in response to movement of the primary flow belt 112 and/or the diverter belt 122a. As shown in the illustrated embodiment, the movable components 116 can rotate about the x-axis (represented by arrow 118) in response to translation of the diverter belt 122a in a direction along the y-axis (represented by arrow 126). An article (not shown) positioned on the primary flow belt 112 and contacting the movable components 116 could thereby translate in a direction along the y-axis. This can allow the diverter belt 122a to redirect or divert articles in a direction which is generally orthogonal to the primary flow path. In several embodiments, when the movable components 116 pass over the diverter belt 122a, the movable components 116 are in continuous contact with the diverter belt 122a. In some implementations, the diverter belt 122a is vertically fixed relative to the primary flow belt 112. For example, in some embodiments, the diverter belt 122a as a whole does not move up and down and/or into and out of engagement with the movable components 116. In some embodiments, the diverter belt 122a is maintained in constant contact with and/or is continuously engaged with (e.g., abutted against) at least one of the movable components 116, such as the protruding lower portion of at least one spherical ball. In certain embodiments, the primary flow belt 112 does not include one or more motors that rotate the movable components 116 relative to other of the movable components 116 and/or a base of the primary flow belt in which the movable components 116 are journaled.

Figure 2B:
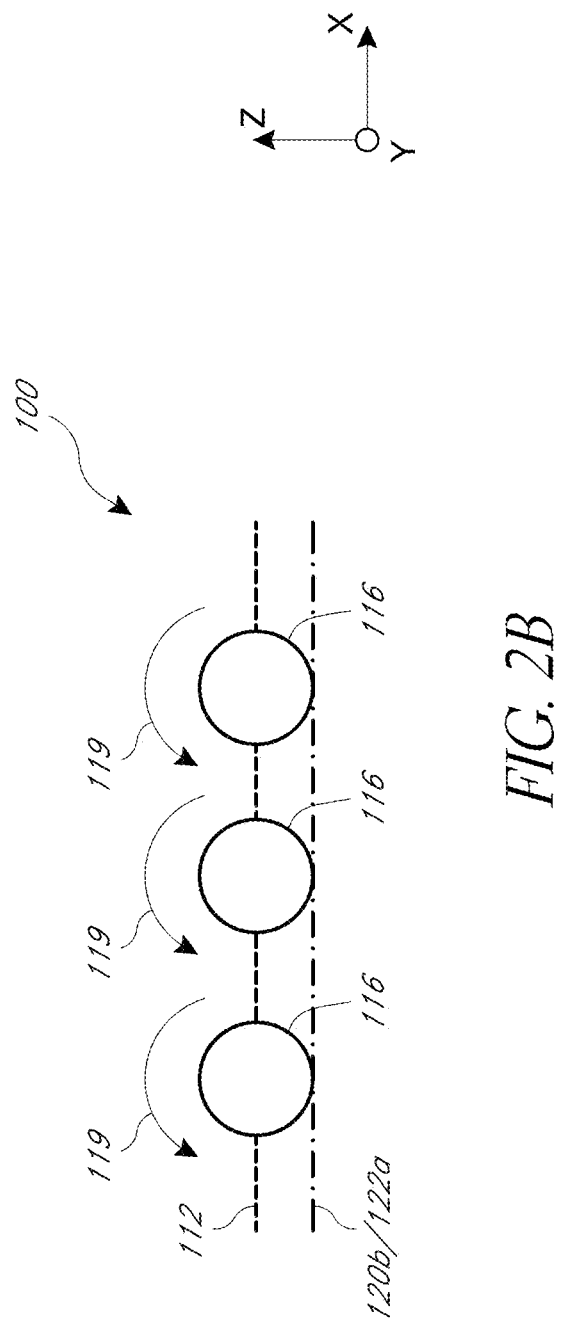
FIG. 2B is another partial cross-sectional schematic of the modular transfer unit of FIG. 1.

FIG. 2B is a section taken at 90 degrees relative to the section of FIG. 2A. The primary flow belt 112 can be positioned above the filler sheet 120b and/or the diverter belt 122a. The primary flow belt 112 can move at a main belt speed relative to the filler sheet 120b and/or the diverter belt 122a. Lower portions of the movable components 116 of the primary flow belt 112 can contact the filler sheet 120b and/or the diverter belt 122a. The movable components 116 can move in response to movement of the primary flow belt 112 over the filler sheet 120b. As shown in the illustrated embodiment, the movable components 116 can rotate about the y-axis (represented by arrow 119) in response to interaction with the filler sheet 120b and/or the diverter belt 122a. An article (not shown) positioned on the primary flow belt 112 and contacting the movable components 116 could thereby translate in a direction along the x-axis or along the primary flow direction. An article (not shown) positioned on the primary flow belt 112 and contacting the movable components 116 could thereby translate in a direction along the primary flow direction relative to the primary flow belt 112. The article can translate at a conveyance speed. The conveyance speed can be double that of the main belt speed.

In some embodiments, the filler sheets 120b assist in maintaining a substantially constant conveyance speed of the conveyed article. As discussed above, when the movable components 116 are in contact with the diverter belt 122a, the article can be conveyed at a speed that is greater than the speed of the primary flow belt 112 due to the additional velocity provided by the rotation of the movable components 116. However, when the movable components 116 are not in contact with the diverter belt 122a, the conveyed speed in such a region of the primary flow belt 112 can drop to that of the speed of the primary flow belt 112. This change in conveyance speed may be undesirable, such as because it may result in unintended movement of the article relative to the belt 112, reduced ability to track the location of the article, and/or increased difficulty in handing the article. In some embodiments, the filler sheets 120b can substantially or completely fill a gap, such as between a first diverter belt 122a and a second diverter belt 122a, thereby maintaining the rotation of the movable components 116. This can result in the conveyance speed of the article remaining substantially constant. In various embodiments of the modular transfer unit 100, the conveyed speed of the article is substantially constant along the length of the modular transfer unit 100. In some variants of the modular transfer unit 100, the conveyed article on the primary flow belt 112 does not experience a sudden change in speed as an article passes into or out of a region in which the movable components 116 are in contact with the diverter belt 122a. In several embodiments of the modular transfer unit 100, the movable components 116 on the article conveying side (e.g., the top side, not the return side) of the primary belt 112 remain in motion (e.g., rotation) throughout the length of the modular transfer unit 100. In some implementations, a substantially constant speed indicates a maximum change in speed of approximately 10%. The filler sheet 120b can comprise a unitary sheet, or a plurality of individual sheets that together form the filler sheet 120b.

While the modular transfer unit 100 was described as having a single infeed side 102, a single pass-through side 104, and two divert sides 106, 108, it is to be understood that fewer or greater number of sides may be used (e.g., five or more sides). Moreover, it is to be understood that the modular transfer unit 100 can include two infeed sides and two discharge/divert sides. For example, the modular transfer unit 100 may receive articles at sides 102, 106. Articles received at side 102 may be discharged at side 104 or diverted to side 108. Articles received at side 106 may be discharged at side 108 or diverted to side 104. The modular aspect of the modular transfer unit 100 can beneficially allow the modular transfer unit 100 to be implemented in a wide variety of conveyance systems.

Figure 3:
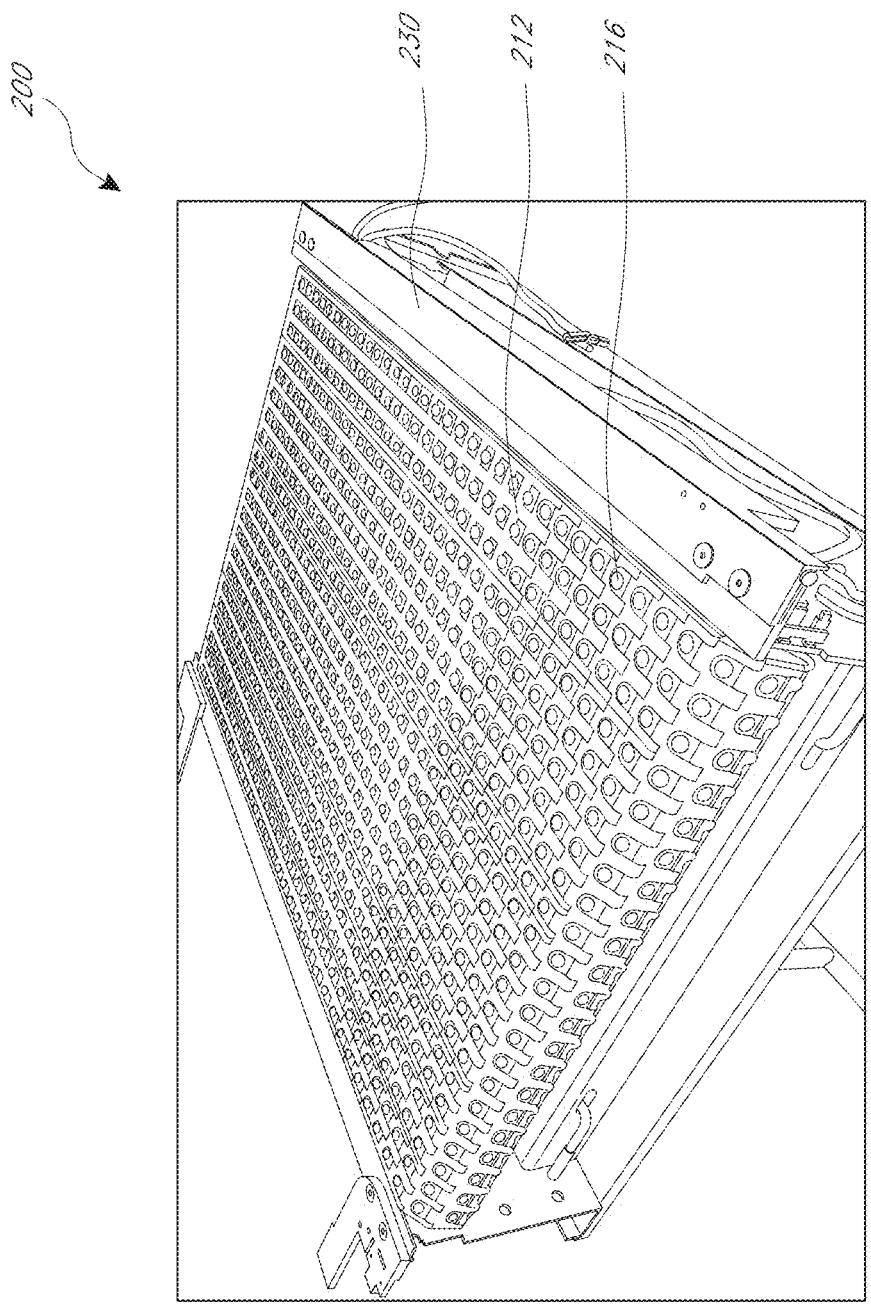
FIG. 3 is a perspective view of an embodiment of a modular transfer unit.

With reference next to FIG. 3, an embodiment of a modular transfer unit 200 is illustrated. The modular transfer unit 200 can include components, features, and/or functionality which are the same or similar to those of other modular transfer units described herein, such as modular transfer unit 100 described above. The modular transfer unit 200 can include a primary flow belt 212. The primary flow belt 212 can comprise a modular conveyor belt, such as a belt made of hingedly-connected belt modules (e.g., links). The primary flow belt 212 can include multiple movable components 216 in the form of spherical balls. The primary flow belt 212 can be operated via one or more drivers, such as motorized rollers (not shown). Components of the modular transfer unit 200 can be supported by a frame 230. This can allow the modular transfer unit 200 to be swapped in and out of a conveyor system on an as-needed basis.

Example of a Modular Transfer Unit

Figure 4:
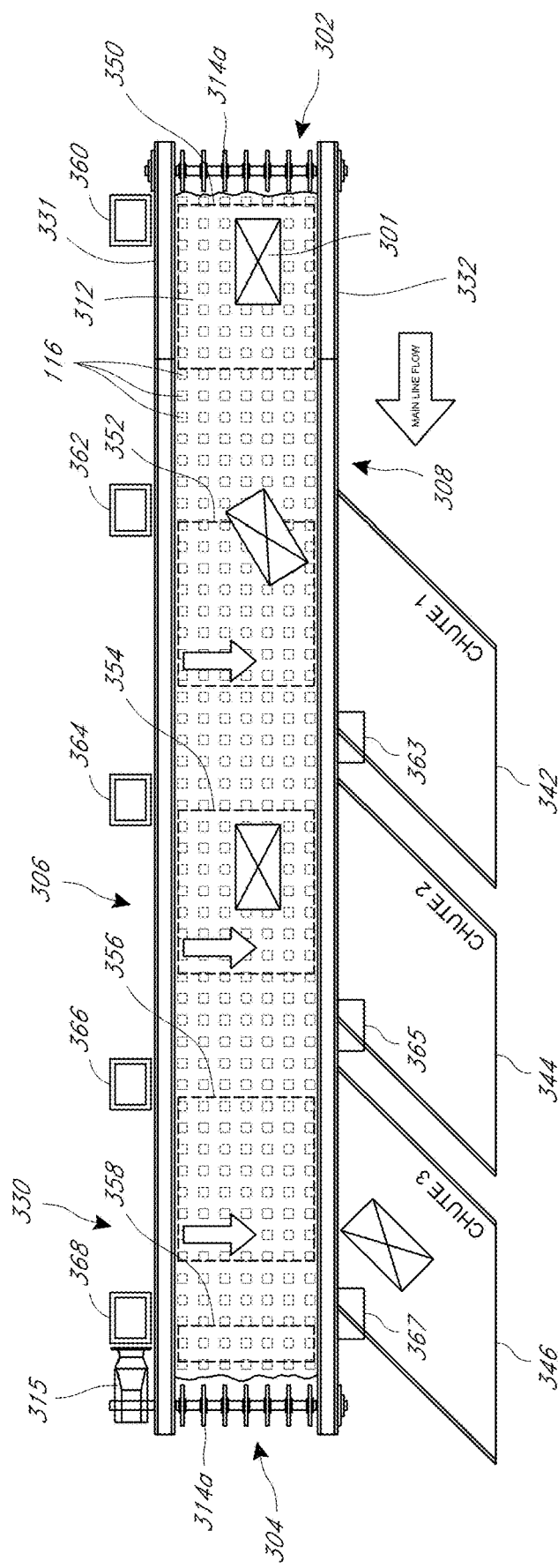
FIG. 4 is a top down schematic view of the modular transfer unit.

FIG. 4 shows a modular transfer unit 300. Similar to the modular transfer units 100 and 200, the modular transfer unit 300 can include an infeed side 302 and a pass-through side 304. A main belt 312 (shown in partial cut-away) can extend from the infeed side 302 to the pass-through side 304. The main belt 312 can include a plurality of hingedly-connected belt modules. The belt modules can together form a loop. The loop can have an article conveying side and a return side. The belt modules can include a body. A plurality of the movable components 116 can be rotatably mounted within the body. An upper portion of the movable components 116 can protrude above an upper surface of the body and a lower portion can protrude below a lower surface of the body.

A driver 314 can be mounted on the infeed side 302, the pass-through side 304 or elsewhere on the main belt 312. A second driver 314a can be mounted opposite the driver 314. The driver 314 can be coupled with a motor 315. The coupling with the motor 315 can include a transmission for transmitting a torque of the motor to the driver 314. The main belt 312 can be looped over the drivers 314, 314a. Application of a torque to the driver 314 can rotate the driver 314 and thereby translate the main belt 312 in a primary flow direction from the infeed side 302 towards the pass-through side 314. The drivers 314, 314a can be sprockets, rollers, lagged rollers, or other engagement members. The motor 315 can be included with a gearbox or transmission.

At or adjacent to the infeed side 302, the modular transfer unit 300 can include an infeed detection zone 350. The infeed detection zone 350 can be associated with an article sensor 360. At or adjacent to the pass-through side 304, the modular transfer unit 300 can include a pass-through detection zone 358. The pass-through detection zone 358 can be associated with an article sensor 368.

At different points along the main belt 312 between the infeed and pass-through sides 302, 304, the modular transfer unit 300 can include one or more divert zones. The modular transfer unit 300 includes first, second, and third divert zones 352, 354, 356, although a greater or lesser number may be included in the modular transfer unit 300. The divert zones 352, 354, 356 can be aligned with one or more diverter systems, as discussed further below.

The divert zones 352, 354, 356 can be associated with one or more article sensors. The article sensors can include sensors 362, 364, and 366. The article sensors can be one-dimensional (e.g., linear) across the primary flow belt 312. The article sensors can define or align with a leading edge of the divert zones 352, 354, 356 and/or the detection zones 350, 358. In some embodiments, the article sensors can be a photo-eye. However, it is to be understood that other types of sensors can be utilized, such as optical sensors, electromagnetic sensors, weight sensors, and other types of sensors. Moreover, although the detection zones of the illustrated embodiment are linear in the plane of the primary flow belt 312, it is to be understood that the detection zones can be two-dimensional in the plane of the primary flow belt 312 and/or three-dimensional.

The divert zones 352, 354, 356 can be aligned with one or more divert chutes. The divert chutes can include first, second, and third chutes 342, 344, 346. As shown, the first, second, and third divert zones 352, 354, 356 align with first, second, and third chutes 342, 344, 346, respectively. The divert chutes 342, 344, 346 can be other conveyor units, other modular transfer units, roller take-away units, catch-baskets, or other components of a conveyor system. Although illustrated on only one side of the main belt 312, the divert chutes 342, 344, 346 can be aligned on either side thereof.

The chutes 342, 344, 346 can be associated with one or more article sensors. The article sensors can include sensors 363, 365, and 367. The article sensors can be one-dimensional (e.g., linear) across the chutes 342, 344, 346, or multi-dimensional. In some embodiments, the article sensors can be formed by a photo-eye. However, it is to be understood that other types of sensors can be utilized, such as optical sensors, electromagnetic sensors, weight sensors, and other types of sensors.

In some embodiments, information pertaining to the detection and divert zones can be relayed to a control system of the modular transfer unit 300 and/or a control system of other components of the conveyor system to which the modular transfer unit 300 is attached. This can allow the control system to control the operation of the modular transfer unit 300 based on the status of the articles on the modular transfer unit 300. The article sensors can provide an indication that the modular transfer unit 300 has received an article at the infeed side 302 of the modular transfer unit 300. The article sensors can provide an indication that the modular transfer unit 300 has discharged an article through the pass-through detection zone 358. The article sensors can sense arrival of an article at the divert zones or at the chutes.

In some embodiments, the modular transfer unit 300 can include an on-board controller to which information pertaining to the detection and divert zones can be relayed. This can allow the modular transfer unit 300 to further operate as a stand-alone unit. In some implementations, the on-board controller can be connected to the conveyor system to which the modular transfer unit 300 is attached. This can allow the modular transfer unit 300 to receive instructions from the conveyor system about specific articles being conveyed. Such instructions may include whether to allow the article to pass through the modular transfer unit 300 or to be diverted from the primary flow path of the conveyor system.

The modular transfer unit 300 can include a frame 330. The frame 330 can comprise one or more structural support components of modular transfer unit 300. The frame 330 can be comprised of steel, aluminum, or other rigid materials. The frame 330 can be modular. The frame 330 can include one or more smaller (e.g., shorter) structural support components or standardized modules that are assembled together to form the full length of the frame 330. Accordingly, the length of the frame 330 can be customizable depending on usage requirements.

The frame 330 can provide structural support to the drivers 314, 314a to support the main belt 312. The drivers 314, 314a, and/or motor 315 can be coupled with one or more mounting locations on the frame 330. In one implementation, the drivers 314, 314a can be journaled within the frame 330. The article sensors can be mounted on the frame 330. The frame 330 can provide mounting locations to connect the modular transfer unit 300 with the chutes and/or other adjacent components of a conveyor system, such as at the infeed and/or pass-through sides 302, 304.

The frame 330 can include a track system. The track system can include first and second tracks 331, 332. The first and second tracks 331, 332 can be made of steel, aluminum, or other materials. The first and second tracks 331, 332 can extend along opposite sides of the main belt 312. The drivers 314, 314a, and/or motor 315 can be mounted on the tracks 331, 332.

The frame 330 can make the modular transfer unit 300 a standalone, self-contained system capable of operating separately from a conveyor system. In some implementations, the frame 330 can be sized to fit between components of a conveyor system. This can beneficially allow the modular transfer unit 300 to be implemented on an as-needed basis in a conveyor system. In doing so, the modular transfer unit 300 can be swapped from one position in a conveyor system to another position in the conveyor system depending on the needs of the operator. In some implementations, the frame 330 can be sized to be retrofitted to existing conveyor systems.

Figure 5:
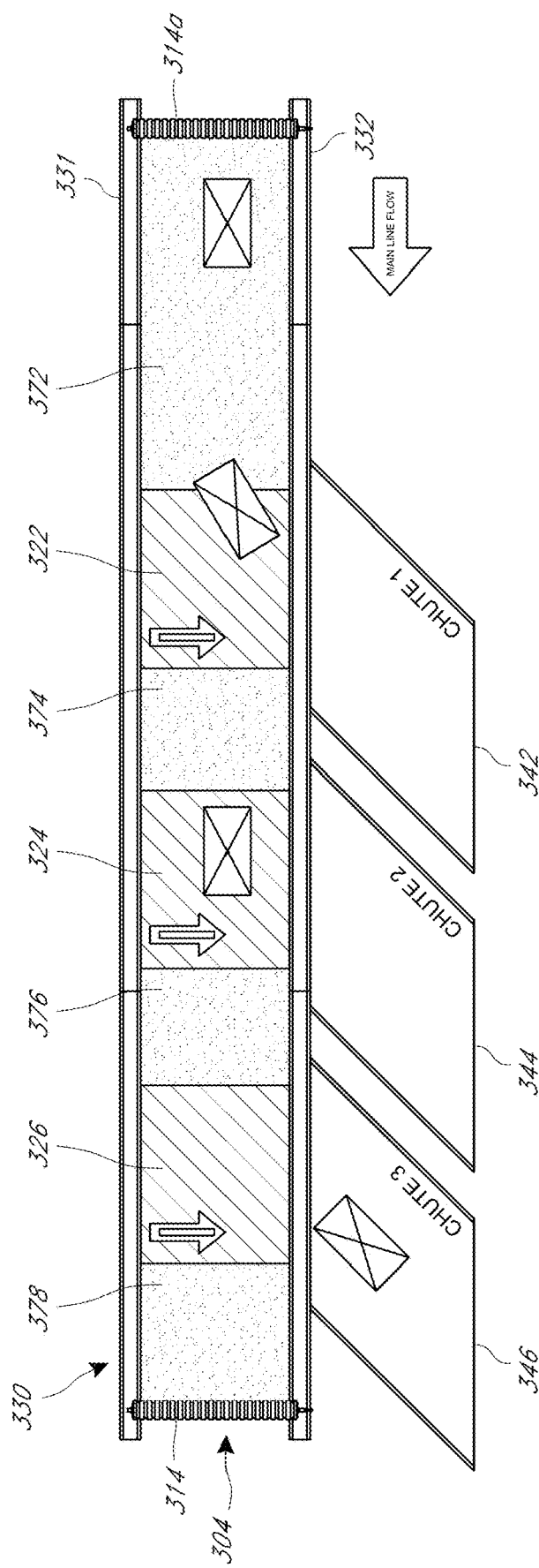
FIG. 5 is a top down schematic view of the modular transfer unit having a main belt removed for clarity.

The modular transfer unit 300, shown without the main belt 312 in FIG. 5, can include one or more of diverter systems. The diverter systems can include diverter systems 322, 324, 326. The diverter systems 322, 324, 326 can correspond to the divert zones 352, 354, 356, respectively. The diverter systems 322, 324, 326 can operate like the diverter system 120a and include the same components. The diverter systems 322, 324, 326 can each include a divert belt, drivers, motors, and mounting brackets or similar structure. The divert belt can contact the lower portion of the movable components 116 of the main belt 312. The diverter systems 322, 324, 326 can be aligned generally perpendicularly with the primary flow direction of the main belt 312, or at any other angle. The angle of divert from the diverter station can be determined by a ratio of the main belt speed to the diverter belt speed. By operating the divert belt of a diverter system, the movable components 116 can be rotated, as described above with respect to FIG. 2A. The operation of the divert belt can carry the article passing on the main belt 312 through one of the divert zones 352, 354, 356 towards one of the first or second divert sides 306, 308. The operation of the divert belt can carry the article off the main belt 312 and into the chute corresponding with the divert zone.

The modular transfer unit 300 can be configurable. The divert zones and/or the detection zones can be positioned along the frame 330 between the infeed and pass-through ends 302, 304. Accordingly, the positions of the diverter systems and/or chutes can be adjustable depending on use.

Figure 6:
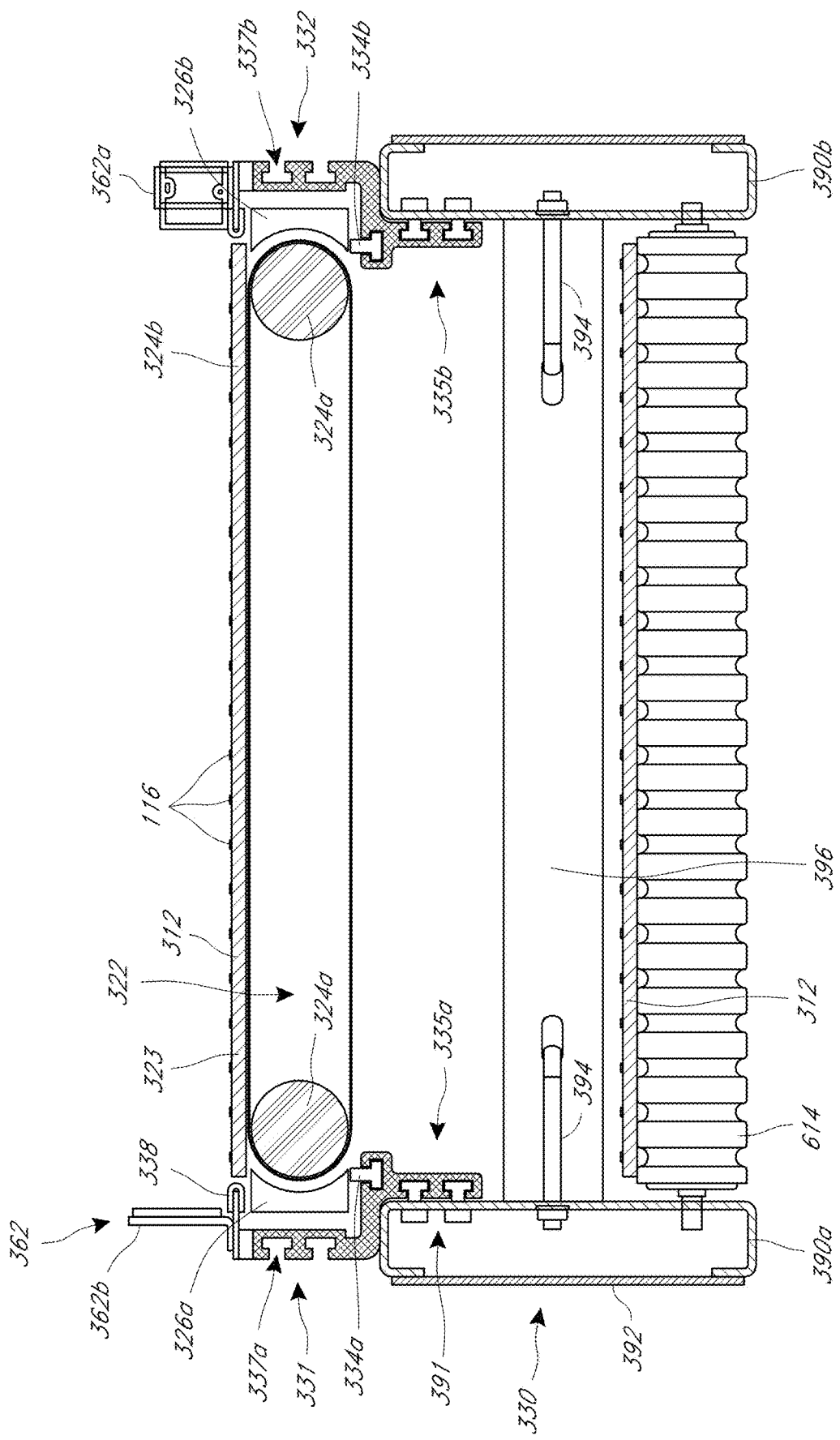
FIG. 6 is a cross-section of the modular transfer unit at a diverter system.

FIG. 6 is a cross-section of the modular transfer unit 300 through a diverter system. The modular transfer unit 300 can include the frame 330. The frame 330 can include multiple structural components that are assembled together to provide a rigid platform for the tracks 331, 332. The frame 330 can include support rails. The support rails can include first and second support rails 390a, 390b. The first support rail 390a can be aligned on opposite sides of the modular transfer unit 300. The support rails 390a, 390b can have a structurally rigid cross-sectional shape. In some implementations, the support rails 390a, 390b can have an I-beam or C-beam shape. The support rails 390a, 390b can be made of a rigid material such as steel, aluminum, or other suitable metals or non-metallic materials.

The support rails 390a, 390b can include one or more caps 392. The caps 392 can be attachable by one or more mechanical couplers or adhesives. The caps 392 can enclose interior portions of the support rails 390a, 390b. The interior portions can include access to the attachment locations for the tracks 331, 332, J-bolts 393, and/or rollers, or other catenary supports 614.

A strut or multiple struts 396 can connect the support rails 390a, 390b. Multiple struts 396 can located between the in-feed end 302 and the pass-through end 304 of the unit 300. In one embodiment, the strut 396 can be attached to the first and second rails 390a, 390b by J-bolt assemblies. The J-bolt 394 can attach at one end within an aperture of the strut 396. An opposite end of the J-bolt 394 can attach with one of the support rails 390a, 390b. The opposite attachment end of the J-bolt 394 can include a threaded section that can be inserted through an aperture in the support rail. A nut or other mechanical attachment can be attached with the J-bolt such at the threaded end. The strut 396 can provide support and rigidity to the other components of the modular transfer unit 300.

The main belt 312 can be looped over the drivers 314, 314a with an upper portion located on top of the modular transfer unit 300. A lower portion of the main belt 312 can be routed below or interior to the support rails 390a, 390b. In one implementation, the modular transfer unit 300 includes one or more rollers or catenary supports 614. The rollers or other support structures 614, such as but not limited to a flat support panel, ribs or other structure, can provide support to prevent sagging of the main belt 312 as it returns around the drivers 314, 314a. The rollers or catenary supports 614 can be attached between the support rails and provide support the lower portion of the main belt 312. A shaft of the roller 614 can be journaled within the support rails 390a, 390b.

The support rails 390a, 390b can include a track mount 391. The track mount 391 can provide an attachment location for attaching the tracks 331, 332 with the support rails 390a, 390b. The track mount 391 can include one or more apertures for receiving bolts or other suitable mechanical couplers.

The track 331 can include a lower portion 335a and an upper portion 337a. The track 332 can have the same structural components as the track 331. The lower portion 335a can be attachable with one of the support rails 390a, 390b. The lower portion 335a can be attachable with the track mount 391 on an upper end of the support rail 390a. The lower portion 335a can include one or more channels or apertures. The channels or apertures can be sized to receive one or more bolts or screws or other mechanical couplers for attaching at the track mount 391.

The lower portion 335a can include one or more T-shaped channels. The T-shaped channels can be sized to receive a head of a support element, such as a bolt. The head can be slidable within the channel along the length of the track 331. A threaded end of the bolt can protrude from the T-shaped channel. The threaded end of the bolt can be received within one or more apertures of the upper track mount 391. Nuts can be attached over the threaded end of the bolt to attach the track 331 and the support rail 390a. The bolt can be loosened and/or removed and even with the head of the bolt remaining within the T-shaped channel and the side track 331 can be alternately moved or fixed relative to the support rail 390a thereby.

The upper portion 337a of the track 331 can include one or more apertures or channels. The apertures or channels can include one or more mounting locations for attaching components with the modular transfer system 300. The upper portion 337a can attach with one or more spurs, chutes, or takeaways of a conveyor system. The apertures or channels can include one or more T-shaped slots for receiving the head of one or more bolts. The upper portion 337a can attach with the motor 315, the chutes, or any of the article sensors. The sensor 362 is shown attached with the upper portion 337a of the rail 332 by one or more mechanical fasteners. The sensor 362 can include a light emitter 362a and a reflecting surface 362b opposed on the tracks 331, 332. The upper portion 337a can include one or more belt or chain guides 338.

An inner portion of the track 331 can include an attachment channel 334a. The attachment channel 334a can be oriented upwardly, inwardly, or at an angle to a horizontal. The attachment channel 334a can extend the length of the track 331 or less than the length thereof. The attachment channel 334a can be T-shaped and configured to secure a head of a bolt. The attachment channel 334a can provide an attachment location for any or all of the diverter systems. Like the track 331, the track 332 can include a lower portion 335b, an upper portion 337b, and/or an attachment channel 334b.

The diverter system 322 can include one or more rollers 324a, 324b and a diverter belt 323. The diverter system 322 can include a motor assembly (not shown) for powering and providing torque to the drivers 324a, 324b for rotating and moving the diverter belt 323. The rollers and belt can be disposed underneath the main belt 312. An upper surface of the diverter belt 323 belt can be in contact with the main belt 312. The upper surface of the diverter belt can contact lower surfaces of the rotational members 116.

The diverter system 322 can include one or more brackets 326a, 326b. The brackets 326 can attach the drivers 324a, 324b and/or the motor with the tracks 331, 332. The bracket 326a can attach between the attachment channel 334a and the roller 324a. The head of a bolt can be inserted within channel 334a and attached with the bracket 326a at a threaded protruding end of the bolt. The diverter system 322 can alternately be slidable or fixed within the T-shaped channel 334a by loosening or tightening the bolt. The channels 334a can enable movement of the diverter system 322 longitudinally along the tracks 331, 332.

The above describes one possible implementation of a modular assembly for the diverter systems to be assembled and positionable within tracks of the modular transfer system 300. Other attachment arrangements between the tracks 331 and the diverter systems are within the skill of one of ordinary skill in the art of the present disclosure. The modular design can allow for additional diverter systems or other conveyance stations to be moved, added, or removed from the modular transfer unit 300. This results in limited investment of time to reconfigure the modular transfer unit and minimal downtime.

The modular transfer unit 300 can include one or more filler sheets, as shown in FIG. 5. The filler sheets can include filler sheets 372, 374, 376, 378. The filler sheets 372, 374, 376, 378 can be placed in one or more gaps between the drivers 314, 314a, and/or between the diverter systems 322, 324, 326. The filler sheets 372, 374, 376, 378 can be metal or wood. The filler sheets 372, 374, 376, 378 can include an upper surface that is generally planer or otherwise shaped to engage the movable components 116. The filler sheets 372, 374, 376, 378 can extend across the width of the modular transfer unit (e.g., between the tracks 331, 332). The filler sheets 372, 374, 376, 378 can extend lengthwise (e.g., in the primary flow direction) to substantially fill the gaps. A gap can be considered substantially filled where no linear length greater than a length between rows of movable components 116 in the lengthwise direction is left unfilled. In some implementations, the entire interior length of the modular transfer unit 300 between the driver 314 and driver 314a can be substantially filled with filler sheets 372, 374, 376, 378 or diverter systems 322, 324, 326.

The filler sheets 372, 374, 376, 378 can contact the lower portions of the movable components 116. Contact between the filler sheets 372, 374, 376, 378 and the lower portions can cause the upper portions of the movable components 116 to spin in a direction of the primary flow path of the main belt 312. Articles can travel on the main belt 312 at a main belt speed. Articles also engaged with the movable components 116 can be propelled at conveyance speed in the primary flow direction at a speed greater than the speed of the main belt 312. In some implementations, the engagement of the filler sheets 372, 374, 376, 378 with the movable components doubles the conveyance speed relative to the main belt speed. Engagement of the diverter systems 322, 324, 326 with the lower portions of the movable components 116 can have the same effect on the conveyance speed as moving over the filler sheets. Accordingly, by filling the interior length of the modular transfer unit 300 between the driver 314 and driver 314a with filler sheets 372, 374, 376, 378 or diverter systems 322, 324, 326, the speed of the articles on the main belt can be increased (e.g., doubled) across the entire modular transfer unit 300.

The filler sheets 372, 374, 376, 378 can increase the processing rates of the modular transfer unit relative to conveyances without filler sheets 372, 374, 376, 378. The modular transfer unit 300 can achieve rates of between 50-75 articles per minute, although this number is not limiting. Moreover, the increased speed of the articles from the filler gaps can reduce gaps between the articles on the main belt 312 relative to conveyances without filler sheets 372, 374, 376, 378. Moreover, removal of the filler sheets 372, 374, 376, 378 provides the option of slowing the article processing rate.

In some embodiments, the filler sheets 372, 374, 376, 378 include a noise-reducing element, such as a noise-reducing coating. The noise-reducing element can be located between an upper portion of the filler sheet 372 and the main belt 312 (e.g., the movable components 116). The coating can be a bonded friction coating, resin, polymer, fluoropolymer (e.g., polytetrafluoroethylene), graphite, molybdenum disulfide, rubber, latex, or another material.

Figure 7:
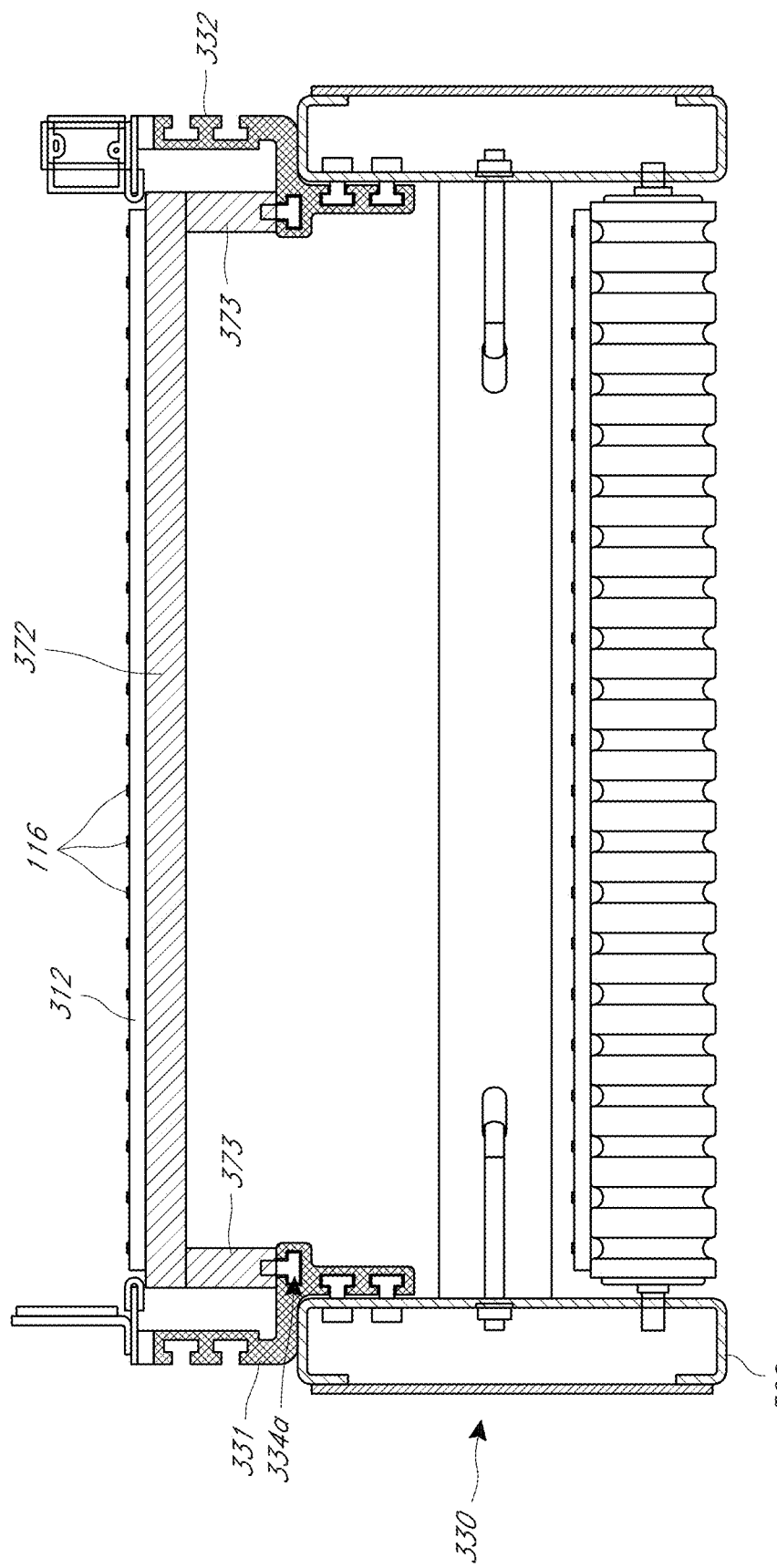
FIG. 7 is a cross-section of the modular transfer unit at a filler sheet.

With reference to FIG. 7, the filler sheets 372, 374, 376, 378 can be mounted with the frame 330. The filler sheet 372 can be mounted across the tracks 331, 332. The filler sheet 372 can include one or more legs 373 having thereon mounts for attachment with the tracks 331, 332. The legs 373 can raise the level of the filler sheet 372 into contact with the main belt 312. The legs 373 can be movably mounted with the channels 334 of the tracks 331, 332. The attachment with the legs 373 can be by one or more bolts. Heads of the bolts can be alternately slidably mounted or tightened with respect to the channels 334. By engagement with the tracks 331, 332, the filler sheets 372, 374, 376, 378 can be reconfigurable to meet system requirements.

Control System of a Modular Transfer Unit

Figure 8:
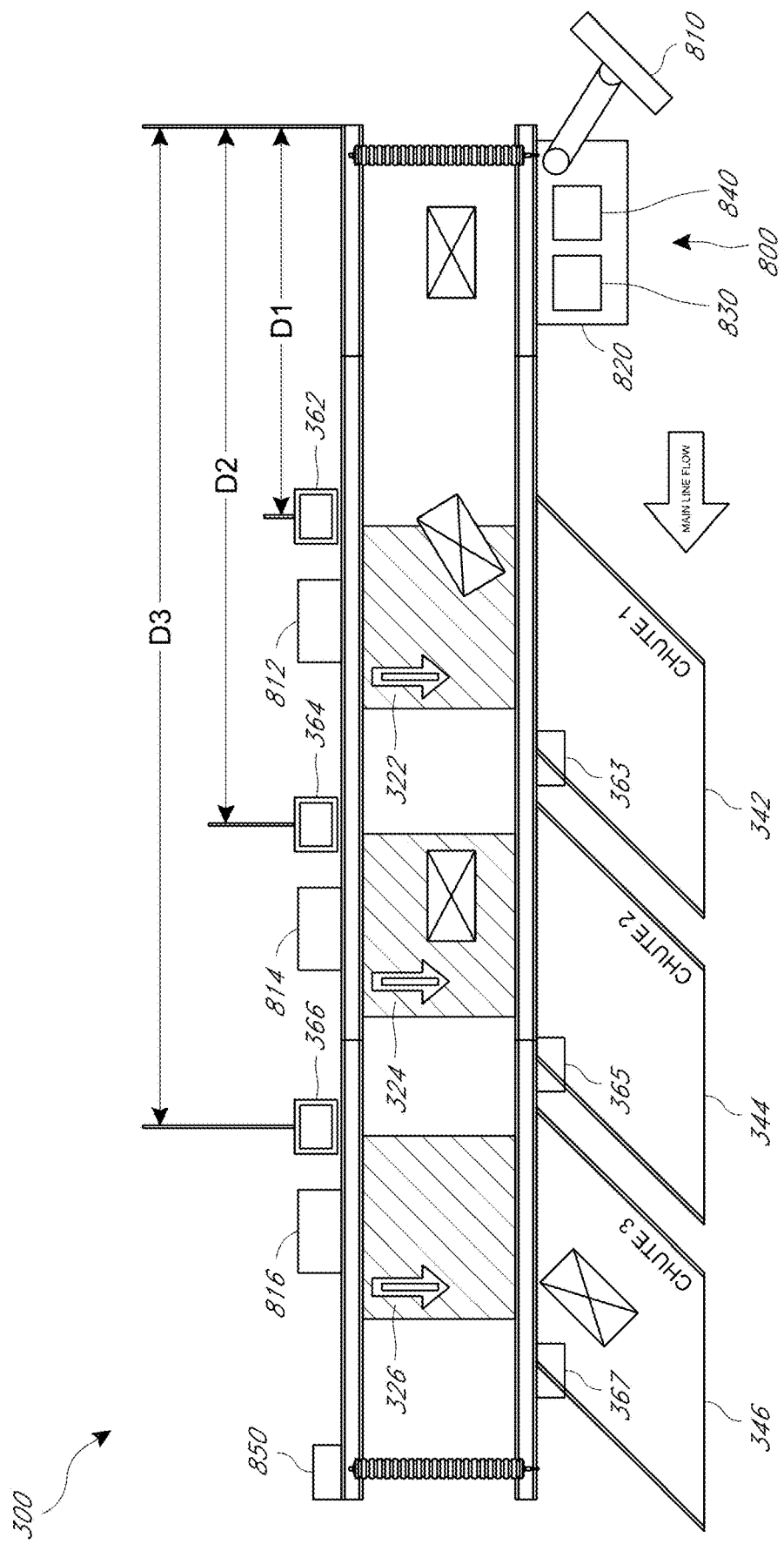
FIG. 8 shows the modular transfer unit having a control system.
Figure 9:
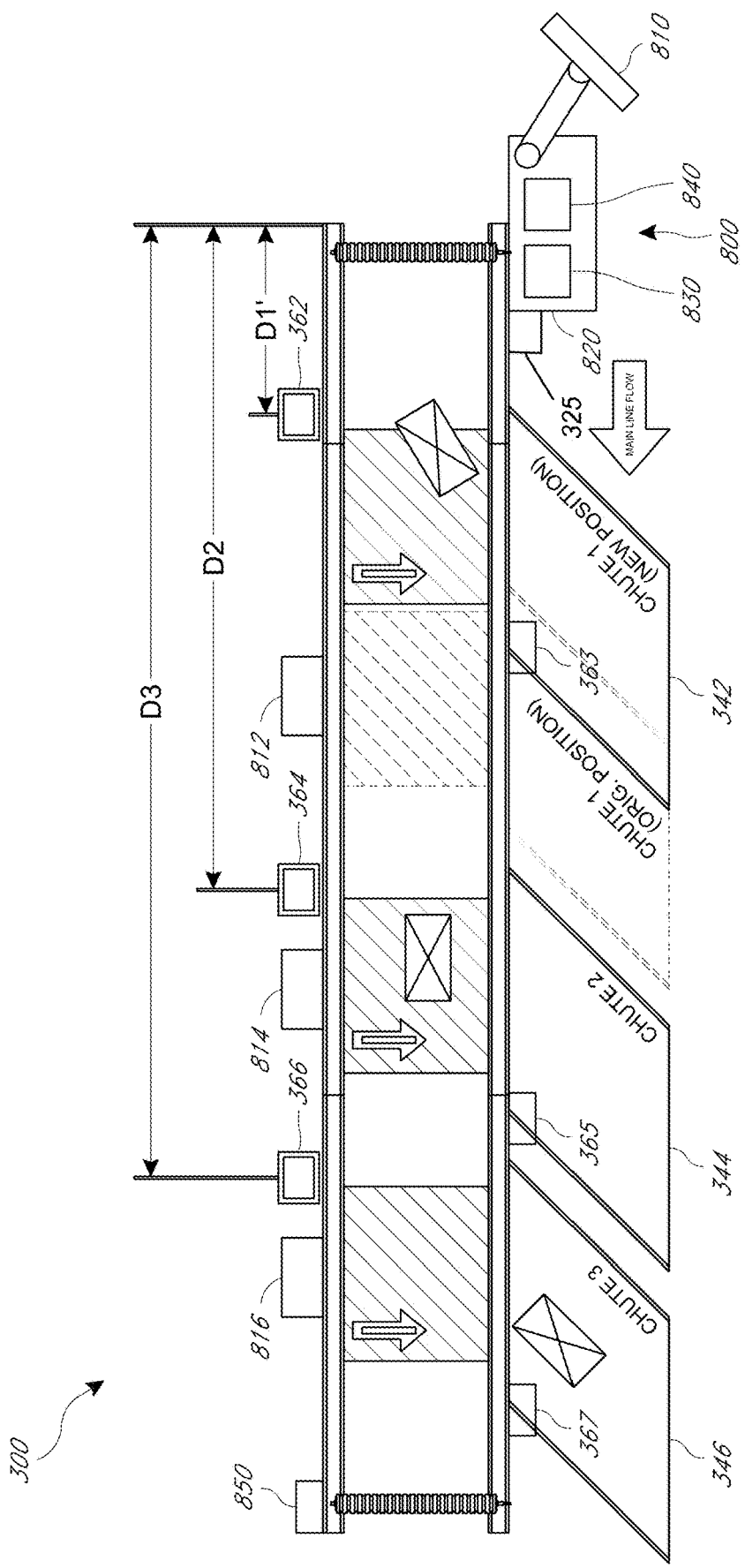
FIG. 9 shows a reconfiguration of the modular transfer unit.

FIGS. 8 and 9 depict the modular transfer unit 300, as described above. The modular transfer unit 300 can further include a control system 800. The control system 800 can include a user interface 810, a programmable controller 820, the programmable controller 820 having a processor 830 and a computer readable medium 840, one or more encoders 850, one or more divert system control modules 812, 814, 816, the one or more article sensors (diverter sensors 362, 364, 366), and/or the one or more article sensors (chute sensors 363, 365, 367).

The user interface 810 can enable setup and configuration of the modular transfer unit 300. The interface 810 can allow a technical or mechanical installer to get the unit 300 setup and ready to be run in a short amount of time. The interface 810 can contain a full suite of setup configurations and/or documentation to assist user in setting up the unit 300. The interface 810 can include a user interface for displaying and one or more user input devices for inputting information for use by the controller 820. The user interface can be a screen. The user input device can be a mouse, keyboard, touchscreen or other user input system.

The interface 810 can facilitate automated and nearly automated setup. The interface 810 can be configured to prompt the user to input the desired parameters for the sorter. The prompt can include: the length of the modular transfer unit 300 (e.g., between the rollers 314, 314a); the width of the modular transfer unit 300; the number of divert system; the number of belts per divert system; a distance (D1, D2, D3) to each of the divert system or to the sensors 362-366; a desired linear speed of the main belt; a location of any filler sheets or gaps; and/or the desired angle of divert into the chutes; or the desired speed of the divert system belts.

The controller 820 can include operation instructions stored on the medium 840 and executable by the processor 830. When executed, the operation instructions can cause the controller 820 to operate the modular transfer system 300.

The one or more encoders 850 can be used to measure a speed of the main belt 312. This information can be used in the operation of the unit 300 by the controller 820. The speed of the main belt 312 can be used to time operation of the diverter systems to divert an article off a side of the main belt 312. In some embodiments, the encoders 850 can be pulse generators. A pulse generator with a trigger wheel (e.g., similar to the flywheel of a car) can be used to measure the main belt 312 speed. This approach can supply adequate resolution for package tracking. Some embodiments of the unit 300 can use a "time of flight" speed tracking model, though the actual tracking may be based on pulses and not a timer in the controller 820. Since article tracking is not always zone-to-zone, knowing the speed of the main belt 312 can be helpful for the controller 820. The one or more encoders and/or pulse generators 850, run delay timers and/or speed reference settings can be used to determine the main belt 312 speed.

The one or more divert system control modules 812, 814, 816 can be used to control the diverter systems. The divert system control modules 812, 814, 816 can be the motor driver cards used to store the settings for the motors of the unit 300. This allows for the motors to remain close to the cards being utilized and to simplify power distribution to the cards. In most cases, the divert system control modules 812, 814, 816 will contain settings for the motors and/or the motion controlling logic to power the diverter systems.

The one or more article sensors (or diverter sensors or chute sensors) can be used to send a signal to the controller 820 to locate an article. The diverter sensors can indicate the presence or approach of an article to the diverter system. The controller 820 can then selectively operate the diverter system. The chute sensors can confirm that the article has been diverted.

The controller 820 can communication with a controller of a main conveyor system with which the unit 300 is interface. The controller 820 can communicate with a barcode scanner or OCR system on the unit 300 to identify articles thereon. The controller 820 can communicate with the divert system control modules. The controller 820 can communicate with the encoder 850. The controller 820 can track packages along the sorter (e.g., to time the diverter belts). The controller 820 can collect data for the unit 300 such as, but not limited to: the number of diverts of articles; the number of missed diverts; the number of misread, or other events. The controller 820 can interface with the interface 810, such as to receive data about the unit 300 for use in the operation instructions execution. In some variants, the controller 820 can initiate safety and stop interlocking, such as by way of a safety relay.

In some embodiments, the controller 820 can receive a signal from the one or more article sensors that an article on the main belt 312 is at a divert zone. The controller 820 can determine that the article is to be diverted to one side or other of the main belt 312. In response to this determination, the controller 820 can initiate the diverter system to divert the article towards the side of the main belt and into one of the chutes. The controller 820 can determine the run delay timing on the diverter system belts. In some embodiments, the one or more chute sensors are used to confirm packages that have made it off the main belt 312. In some embodiments, the unit 300 is not configured to stop or accumulate packages thereon. The one or more diverter sensors, and one or more chute sensors can tie back into the divert system control modules 812, 814, 816 and/or the controller 820.

FIG. 9 depicts the unit 300 with the added complexity of not knowing there was a building column in the way of the chute 342. In this case, the chute 342 and the divert belt 322 have been backed up earlier on the unit 300 (moved to the right in the figure), thereby providing space for the building column. The control system 800 can adjust operation of the modular transfer unit accordingly. In one implementations, the user interface 810 can prompt a user to input the new location of the divert belt 322 relative to a datum. For example, the user can re-enter distance D1 as distance D1'. In another implementation, the track system can include one or more sensors that can detect and/or measure the position of the divert belt 322. The controller 820 can receive this data and adjust operation of the modular transfer unit accordingly. In some embodiments, the control system 800 can detect that the position of the diverter zone has changed, such as with position sensors 325. In certain embodiments, the control system 800 can adjust operation of the divert belt 322 to adapt for the changed position of the diverter zone. For example, the timing and/or speed at which the divert belt 322 is operated can be modified in response to and/or to adapt for the change in position of the diverter zone.

Another Example of a Modular Transfer Unit

Figure 10:
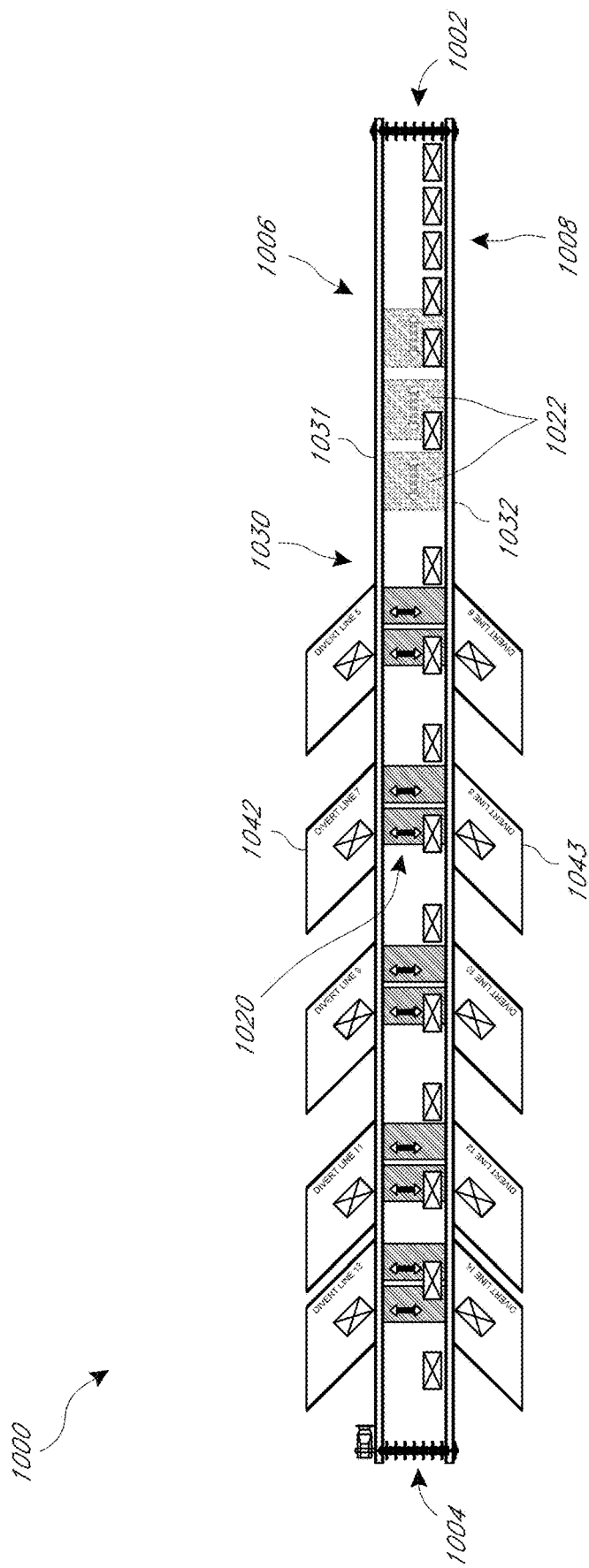
FIG. 10 is a top down schematic of another modular transfer unit.

FIG. 10 depicts a modular transfer unit 1000, similar to the previously described modular transfer units 100, 300. The unit 1000 can include dual-stage diverter belt technology 1020. At the chute stations 1042, 1043, a diverter system with two belts can be used.

The unit 1000 can include one or more diverter systems 1022. The diverter systems 1022 can be aligned to travel in the direction of the primary flow of the main belt (not shown) from the infeed side 1002 to a pass-through side 1004. The diverter systems 1022 can be attached with tracks 1031, 1033, similar to the above described tracks 331, 332. The track system can accommodate reconfiguration of the unit 1000. Depending on usage and the angle of the belt relative to the primary flow direction, the diverter systems 1022 can be used for high speed skew, in-line gapping, merge and diverge tables, and/or pick and pass modules.

FIG. 10 depicts unit 1000 with three inline diverter systems. Certain embodiments have different numbers of inline diverter systems, such as one, two, four, five, six, or more. In some embodiments, the unit 1000 itself can be used to gap and separate products eliminating the need for a brake metering belt induction to the sorter.

Certain Other Embodiments

While certain embodiments have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure. Accordingly, the scope of the present disclosure is defined only by reference to the claims presented herein or as presented in the future.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Certain Terminology

Certain terminology may be used in the following description for the purpose of reference only, and thus is not intended to be limiting. For example, terms such as "upper", "lower", "upward", "downward", "above", "below", "top", "bottom", "left", and similar terms refer to directions in the drawings to which reference is made. Such terminology may include the words specifically mentioned above, derivatives thereof, and words of similar import. Similarly, the terms "first", "second", and other such numerical terms referring to structures neither imply a sequence or order unless clearly indicated by the context.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "spherical" or "circular" or "cylindrical" or "semi-circular" or "semi-cylindrical" or any related or similar terms, are not required to conform strictly to the mathematical definitions of spheres, circles, cylinders or other structures, but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees. As another example, in certain embodiments, as the context may permit, the term "generally perpendicular" can refer to something that departs from exactly perpendicular by less than or equal to 20 degrees.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

SUMMARY

Although the modular conveyor system has been disclosed in the context of certain embodiments and examples, it will be understood by those skilled in the art that this disclosure extends beyond the specifically disclosed embodiments to other alternative embodiments and/or uses of the embodiments and certain modifications and equivalents thereof. The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The invention claimed is:

1. A modular conveyor system comprising:
 a main belt having a first end and a second end, the main belt comprising a plurality of hingedly-connected belt modules, each of the plurality of belt modules comprising a body and a plurality of movable components, the movable components having an upper portion that protrudes above an upper surface of the body and a lower portion that protrudes below a lower surface of the body, the movable components configured to rotate relative to the body;
 a main belt drive unit configured to drive the main belt in a first direction, the main belt drive unit comprising a motor and a drive roller engaged with the main belt;
 a diverter belt configured to travel in a second direction that is generally perpendicular to the first direction, the diverter belt positioned at least partially underneath the main belt such that the diverter belt contacts the protruding lower portion of the movable components and relative movement of the main and diverter belts causes the movable components to rotate;
 a diverter belt motor configured to move the diverter belt, wherein the diverter belt is repositionable between the first end and the second end of the main belt;

a position sensor configured to detect a position of the diverter belt;
a control system comprising a processor and a computer-readable medium having operation instructions thereon, the control system configured to:
receive a signal from the position sensor;
determine, using the signal, a position of a divert zone; and
adjust operation of the diverter belt to adapt for the position of the divert zone.

2. The modular conveyor system of claim 1, wherein the control system is further configured to:
detect that an article on the main belt moving in the first direction is at the divert zone;
determine that the article is to be diverted toward a side of the main belt within the divert zone; and
operate the diverter belt to cause the article to change from moving primarily in the first direction to moving primarily in the second direction and toward the side of the main belt.

3. The modular conveyor system of claim 2, wherein detecting that the article on the main belt moving in the first direction is at the divert zone is based at least partly on a signal received from an article sensor.

4. The modular conveyor system of claim 3, wherein detecting that the article on the main belt moving in the first direction is at the divert zone is based at least partly on a time delay after receiving the signal from the article sensor, the article sensor being positioned at a location before the divert zone in the first direction.

5. The modular conveyor system of claim 1, further comprising:
a user interface;
wherein the control system is further configured to prompt a user through the user interface to input the position of the diverter belt relative to a datum.

6. The modular conveyor system of claim 1, wherein determining the position of the divert zone is automatic.

7. The modular conveyor system of claim 1, wherein the diverter belt motor is configured to move the diverter belt in the second direction.

8. The modular conveyor system of claim 1, further comprising:
a second diverter belt configured to travel in the second direction, the second diverter belt positioned at least partially underneath the main belt such that the second diverter belt contacts the protruding lower portion of the movable components and relative movement of the main and second diverter belts causes the movable components to rotate;
a second diverter belt motor configured to move the second diverter belt, wherein the second diverter belt is repositionable between the first end and the second end of the main belt; and
a second position sensor configured to detect a position of the second diverter belt;
and wherein the control system is further configured to:
receive a signal from the second position sensor;
determine, using the signal from the second position sensor, a position of a second divert zone; and
adjust operation of the second diverter belt to adapt for the position of the second divert zone.

9. A conveyor assembly comprising an infeed belt and an outfeed belt operably connected with the modular conveyor system of claim 1.

10. A modular conveyor system comprising:
a primary flow system comprising:
a primary belt configured to convey an article along a primary direction of travel, the primary flow belt comprising a first lateral side, a second lateral side, and a plurality of balls having three rotational degrees of freedom;
a primary belt motor configured to drive the primary belt;
a diverter system comprising:
a diverter belt configured to divert the article from the primary direction of travel, the diverter belt contacting an underside of the plurality of balls in a first section of the primary belt, the first section extending from substantially the first lateral side of the primary flow belt to substantially the second lateral side of the primary flow belt;
a diverter belt motor configured to move the diverter belt;
a position sensor configured to detect a position of the diverter belt;
a control system configured to:
detect a position of a divert zone based at least partly on a signal from the position sensor indicative of a position of the diverter belt; and
adjust operation of the diverter belt to adapt for the detected position of the divert zone.

11. The modular conveyor system of claim 10, wherein adjusting operation of the diverter belt to adapt for the detected position of the divert zone includes operating the diverter belt to cause the article to change from moving primarily in the primary direction to moving primarily in the second direction.

12. The modular conveyor system of claim 11, wherein the control system is further configured to detect that the article on the primary belt moving in the primary direction is at the divert zone is based at least partly on a signal received from an article sensor.

13. The modular conveyor system of claim 12, wherein the control system is further configured to detect that the article on the primary belt moving in the primary direction is at the divert zone is based at least partly on a time delay after receiving the signal from the article sensor, the article sensor being positioned at a location before the divert zone in the primary direction.

14. The modular conveyor system of claim 10, wherein the diverter belt motor is configured to move the diverter belt in a direction generally perpendicular to the primary direction.

15. The modular conveyor system of claim 10, further comprising:
a second diverter belt configured to divert the article from the primary direction of travel, the second diverter belt contacting an underside of the plurality of balls in a second section of the primary belt;
a second diverter belt motor configured to move the second diverter belt; and
a second position sensor configured to detect a position of the second diverter belt;
and wherein the control system is further configured to:
detect a position of a second divert zone based on a signal from the second position sensor indicating a position of the second diverter belt; and
adjust operation of the second diverter belt to adapt for the detected position of the second divert zone.

16. A conveyor assembly comprising an infeed belt and an outfeed belt operably connected with the modular conveyor system of claim 10.

17. A modular conveyor system comprising:
a primary flow system comprising:
- a primary belt configured to convey an article along a primary direction of travel, the primary flow belt comprising a first lateral side, a second lateral side, and a plurality of balls having three rotational degrees of freedom;
- a primary belt motor configured to drive the primary belt;

a diverter system comprising:
- a diverter belt configured to divert the article from the primary direction of travel, the diverter belt contacting an underside of the plurality of balls in a first section of the primary belt;
- a diverter belt motor configured to move the diverter belt;

a position sensor system configured to detect a position of the diverter belt;

a control system configured to:
- detect, using a first signal from the position sensor system, a configuration of the diverter system;
- detect, using a second signal from the position sensor system, a reconfiguration of the diverter system; and
- automatically detect the reconfiguration of the diverter system and adjust operation of the diverter belt to adapt for the second position of the diverter belt.

18. The modular conveyor system of claim 17, wherein:
- the diverter system further comprises a second diverter belt configured to divert the article from the primary direction of travel, the second diverter belt contacting an underside of the plurality of balls in a second section of the primary belt; and
- the control system is further configured to automatically detect the reconfiguration of the diverter system and adjust operation of the diverter belt to adapt for the second position of the second diverter belt.

19. The modular conveyor system of claim 17, wherein the primary belt comprises a plurality of hingedly-connected belt modules, each of the plurality of belt modules comprising a body and a plurality of the balls.

20. A conveyor assembly comprising an infeed belt and an outfeed belt operably connected with the modular conveyor system of claim 17.

\* \* \* \* \*